United States Patent
Fait

(10) Patent No.: US 10,309,367 B2
(45) Date of Patent: Jun. 4, 2019

(54) SYSTEMS AND METHODS FOR OBTAINING ENERGY FROM SURFACE WAVES

(71) Applicant: Mitchell Fait, Colorado Springs, CO (US)

(72) Inventor: Mitchell Fait, Colorado Springs, CO (US)

(*) Notice: Subject to any disclaimer, the term of this patent is extended or adjusted under 35 U.S.C. 154(b) by 234 days.

(21) Appl. No.: 15/313,586

(22) PCT Filed: Apr. 27, 2015

(86) PCT No.: PCT/US2015/027852
§ 371 (c)(1),
(2) Date: Nov. 23, 2016

(87) PCT Pub. No.: WO2015/187263
PCT Pub. Date: Dec. 10, 2015

(65) Prior Publication Data
US 2017/0191461 A1    Jul. 6, 2017

Related U.S. Application Data

(60) Provisional application No. 62/007,822, filed on Jun. 4, 2014.

(51) Int. Cl.
*F03B 13/10* (2006.01)
*F03B 13/12* (2006.01)
(Continued)

(52) U.S. Cl.
CPC .............. *F03B 13/14* (2013.01); *F03B 13/10* (2013.01); *F03B 13/12* (2013.01);
(Continued)

(58) Field of Classification Search
CPC ......... Y02E 10/20; Y02E 10/30; Y02E 10/38; F03B 13/12; F03B 13/14; F03B 13/16; F03B 13/1815; F03B 13/1845
(Continued)

(56) References Cited

U.S. PATENT DOCUMENTS 3,569,725 A * 3/1971 Rosenberg ............ F03B 13/187
290/42
6,756,695 B2    6/2004 Hibbs et al.
(Continued)

FOREIGN PATENT DOCUMENTS

| WO | 2013029012 | 2/2013 |
|---|---|---|
| WO | 2014172686 | 10/2014 |
| WO | 2015042346 | 3/2015 |

OTHER PUBLICATIONS

International Search Report dated Jul. 27, 2015 for PCT/US2015/027852; Applicant Fait, Mitchell.

*Primary Examiner* — Mark A Laurenzi
*Assistant Examiner* — Mickey H France
(74) *Attorney, Agent, or Firm* — Thorpe North & Western, LLP

(57) ABSTRACT

A system for obtaining energy from surface waves is disclosed. The system can include an array of buoys. The array of buoys can include a framework having a plurality of vertical members. The array of buoys can also include a base buoy coupled to the framework to support the framework in a body of water and maintain the vertical members in a vertical orientation. The array of buoys can further include a plurality of movable buoys. Each of the plurality of movable buoys can be movably disposed about a different one of the vertical members and configured to move relative to the respective vertical members and the base buoy in response to a wave in the body of water. Additionally, the array of buoys can include an energy conversion device operable with each of the plurality of movable buoys to generate power from movement of the movable buoys relative to the vertical members.

27 Claims, 20 Drawing Sheets

(51) Int. Cl.
*F03B 13/14* (2006.01)
*F03B 13/18* (2006.01)
*F03B 13/20* (2006.01)

(52) U.S. Cl.
CPC .......... *F03B 13/1845* (2013.01); *F03B 13/20* (2013.01); *F05B 2240/40* (2013.01); *F05B 2250/33* (2013.01); *F05B 2260/406* (2013.01); *Y02E 10/38* (2013.01)

(58) Field of Classification Search
USPC ................ 60/495–507; 290/42, 43, 53, 54; 417/100, 330, 331, 332, 333
See application file for complete search history.

(56) References Cited

U.S. PATENT DOCUMENTS

| | | | |
|---|---|---|---|
| 7,632,041 B2 | 12/2009 | Jean et al. | |
| 7,900,571 B2 | 3/2011 | Jaber et al. | |
| 7,930,885 B2 | 4/2011 | Brown | |
| 8,152,411 B2 | 4/2012 | Ottesen et al. | |
| 8,480,381 B2 | 7/2013 | Burns | |
| 8,869,524 B2 | 10/2014 | Stewart et al. | |
| 2003/0193197 A1 | 10/2003 | Hibbs et al. | |
| 2008/0267712 A1 | 10/2008 | Jean | |
| 2009/0051168 A1* | 2/2009 | Fujisato | F03B 13/1815 290/53 |
| 2010/0084868 A1 | 4/2010 | Shin | |
| 2010/0230971 A1 | 9/2010 | Mackie | |
| 2011/0031749 A1 | 2/2011 | Sapir | |
| 2011/0185719 A1* | 8/2011 | Beane | F03B 13/182 60/497 |
| 2011/0308244 A1* | 12/2011 | Findlay | F03B 13/1815 60/500 |
| 2012/0261923 A1* | 10/2012 | Hassavari | F03B 13/1845 290/53 |
| 2014/0117673 A1 | 5/2014 | Phillips | |
| 2014/0126865 A1 | 5/2014 | Chang | |

* cited by examiner

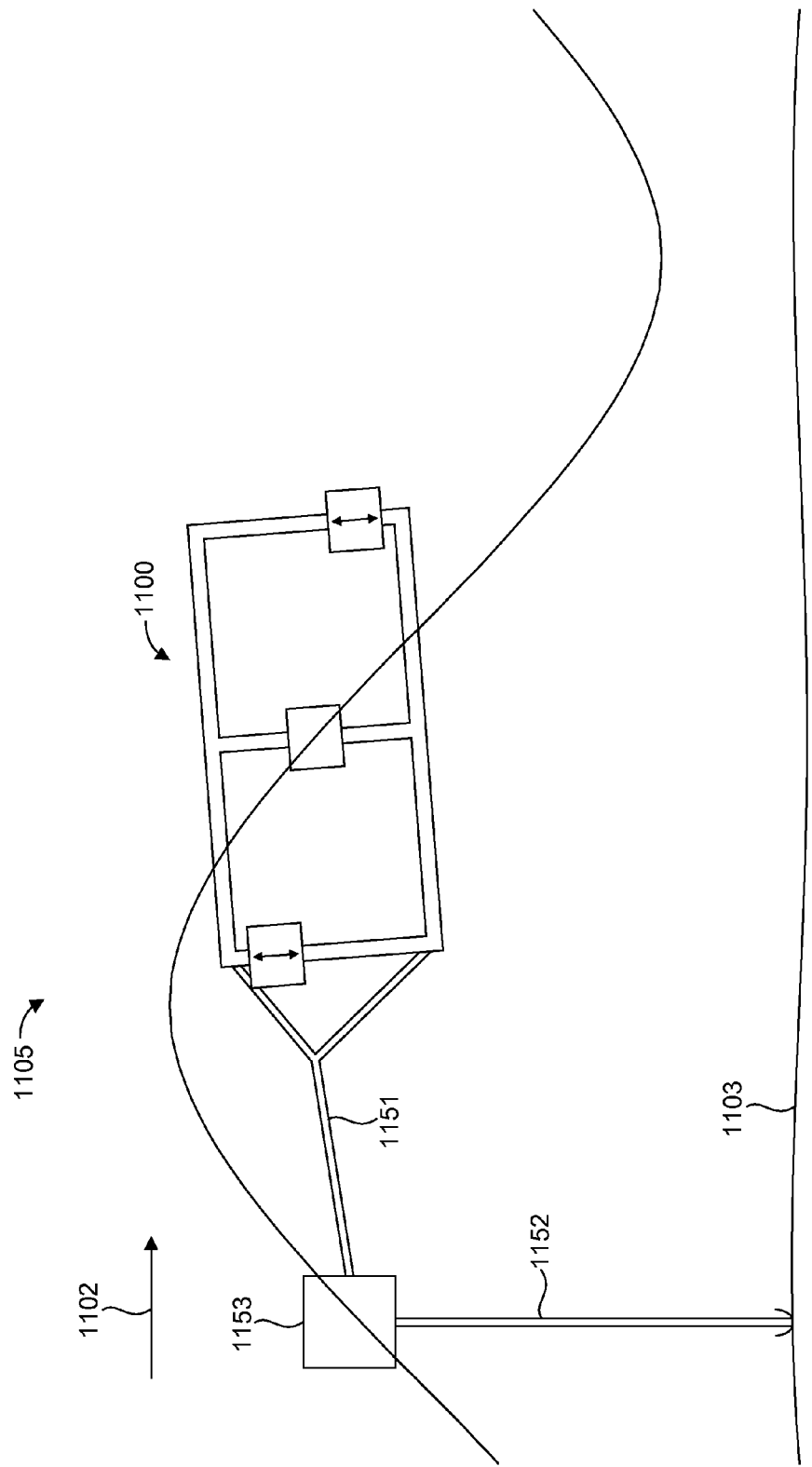

Section A-A

SYSTEMS AND METHODS FOR OBTAINING ENERGY FROM SURFACE WAVES

The present application is a National Stage of International Application No. PCT/US2015/027852, filed on Apr. 27, 2015, which claims the benefit of U.S. Application No. 62/007,822, filed on Jun. 4, 2014, each of which are incorporated herein by reference.

BACKGROUND

The ocean has great potential for generating usable energy if it can be harnessed efficiently. For example, there are a few ways that the ocean can be used to generate useable energy, e.g., use of ocean waves, use of ocean high and low tides, and/or use of temperature differences in the water. There are a few ocean energy power plants, but nothing on a very large scale. Regarding the use of ocean waves, it is known that such waves have a lot of kinetic energy, and this energy can be used to power various systems.

Although there are many systems for generating energy from the movement of ocean water, there is a continued need to find improvements in the way that this wave energy is harnessed.

SUMMARY

A system is disclosed for obtaining or generating energy from surface waves, such as the deep ocean. The system can include an array of buoys. The array of buoys can include a framework having a plurality of vertical members. The array of buoys can also include a base buoy coupled to the framework to support the framework in a body of water and maintain the vertical members in a vertical orientation. The array of buoys can further include a plurality of movable buoys. Each of the plurality of movable buoys can be movably disposed about a different one of the vertical members and configured to move relative to the respective vertical members and the base buoy in response to a wave in the body of water. Additionally, the array of buoys can include an energy conversion device operable with each of the plurality of movable buoys to generate power from movement of the movable buoys relative to the vertical members through the use of any technology known in the art for pumping water, pumping air, electromagnetic induction, or conversion through any other type of mechanical motion. In addition, the system can include a buoyant tether coupled to the array of buoys to secure the array of buoys to an object. In another example, a method for obtaining or generating energy from a wave in a body of water can comprise obtaining an array of buoys as described herein, coupling a buoyant tether to the array of buoys, disposing the array of buoys in the body of water, and securing the array of buoys to an object.

BRIEF DESCRIPTION OF THE DRAWINGS

FIG. 11B illustrates the system of FIG. 11A when subjected to an extreme wave.

DETAILED DESCRIPTION

Figure 1:
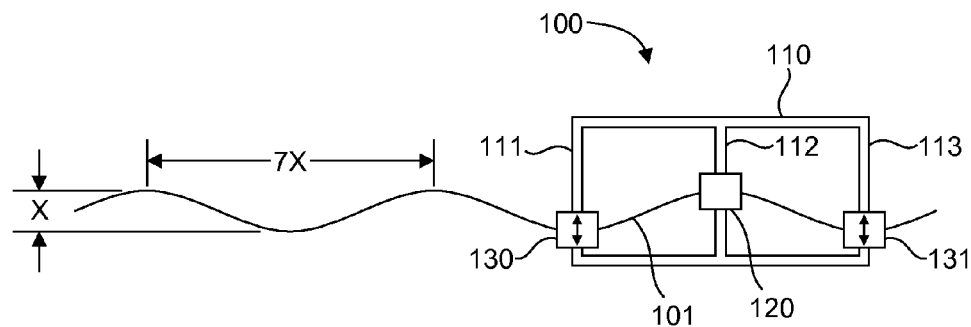
FIG. 1 illustrates an array of buoys for obtaining energy from a wave in a body of water, in accordance with an embodiment of the present disclosure.

Reference will now be made to the exemplary embodiments, and specific language will be used herein to describe the same. It will nevertheless be understood that no limitation of the scope of the disclosure is thereby intended. Alterations and further modifications of the inventive features illustrated herein, and additional applications of the principles of the disclosures as illustrated herein, which would occur to one skilled in the relevant art and having possession of this disclosure, are to be considered within the scope of the disclosure. It is also to be understood that the terminology used herein is used for the purpose of describing particular embodiments only. The terms are not intended to be limiting unless specified as such.

The singular forms "a," "an," and, "the" include plural referents unless the context clearly dictates otherwise. Thus, for example, reference to "a buoy" includes reference to one or more of such buoys, and reference to "the vertical member" includes reference to one or more of such vertical members.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or subranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

In accordance with these definitions and embodiments of the present disclosure, a discussion of the various systems and methods is provided including details associated therewith. This being said, it should be noted that various embodiments will be discussed as they relate to the systems and methods. Regardless of the context of the specific details as they are discussed for any one of these embodiments, it is understood that such discussion relates to other all other embodiments as well.

The present disclosure is drawn to a system for obtaining or generating (converting) energy from surface waves in a body of water. The system can comprise an array of buoys, which can include a framework having a plurality of vertical members. The array of buoys can also include a base buoy coupled to the framework to support the framework in a body of water and maintain the vertical members in a vertical orientation. Furthermore, the array of buoys can include a plurality of movable buoys, wherein each of the plurality of movable buoys is movably disposed about a different one of the plurality of vertical members and configured to move relative to the respective vertical members and the base buoy in response to a wave in the body of water. Additionally, the array of buoys can include an energy conversion device operable with each of the plurality of movable buoys to generate power from movement of the movable buoys relative to the vertical members. In addition, the system can include a buoyant tether coupled to the array of buoys to secure the array of buoys to an object.

In another embodiment, the disclosure provides a method for obtaining or generating (converting) energy from a wave in a body of water. The method can comprise obtaining an array of buoys, the array of buoys including a framework having a plurality of vertical members, a base buoy coupled to the framework to support the framework in a body of water and maintain the vertical members in a vertical orientation, a plurality of movable buoys, wherein each of the plurality of movable buoys is movably disposed about a different one of the plurality of vertical members and configured to move relative to the respective vertical members and the base buoy in response to a wave in the body of water. An energy conversion device operable with each of the plurality of movable buoys to generate power from movement of the movable buoys relative to the vertical members can also be included. The method can also comprise coupling a buoyant tether to the array of buoys, disposing the array of buoys in the body of water and securing the array of buoys to an object. The buoyancy of the tether can be such that the tether is essentially self-supportive in the water and does not drag down or otherwise interfere with the array of buoys when in use.

FIG. 1 shows an array of buoys 100 for obtaining energy from a wave 101 in a body of water. The array of buoys can include a framework 110 having a plurality of vertical members 111, 112, 113. The array of buoys can also include a base buoy 120 coupled to the framework to support the framework in the body of water and maintain the vertical members in a vertical orientation. In one aspect, the base buoy can be fixedly attached to the framework at or near a center of the framework, such as to a middle or primary column, to effectively support the framework in the water. The array of buoys can also include a plurality of movable buoys 130, 131, such that each of the plurality of movable buoys is movably disposed about a different one of the plurality of vertical members, such as an outer column, and configured to move relative to the respective vertical members and the base buoy in response to a wave in the body of water. In one aspect, the movable buoys can be configured to freely move or slide up and down relative to the vertical members and the base buoy. An energy conversion device can also be included and can be operable with each of the plurality of movable buoys to generate power from movement of the movable buoys relative to the vertical members.

It is noted that the embodiment shown in FIG. 1 as well as in FIGS. 2-4c hereinafter may or may not be inherently stable in the ocean, as additional stabilizing structures would typically be included to maintain the vertical members in a generally vertical configuration. These devices are shown in this manner without one or more of the many possible stabilizing structures that could be used in order to more clearly illustrate how the device functions at a basic level. Certain devices that may be more stable in the waves of the ocean are shown by example in FIGS. 7A-8B, and there are many other stable configurations that could likewise be devised that utilize the basic structure shown in FIGS. 1-4c. Furthermore, it is noted that the term "vertical" is defined as being generally vertical with respect to the construction of the framework as the device sits in the water. As waves pass by the device, the "vertical" members will not remain completely vertical at all times, but as mentioned, will be generally vertical in orientation.

Figure 2:
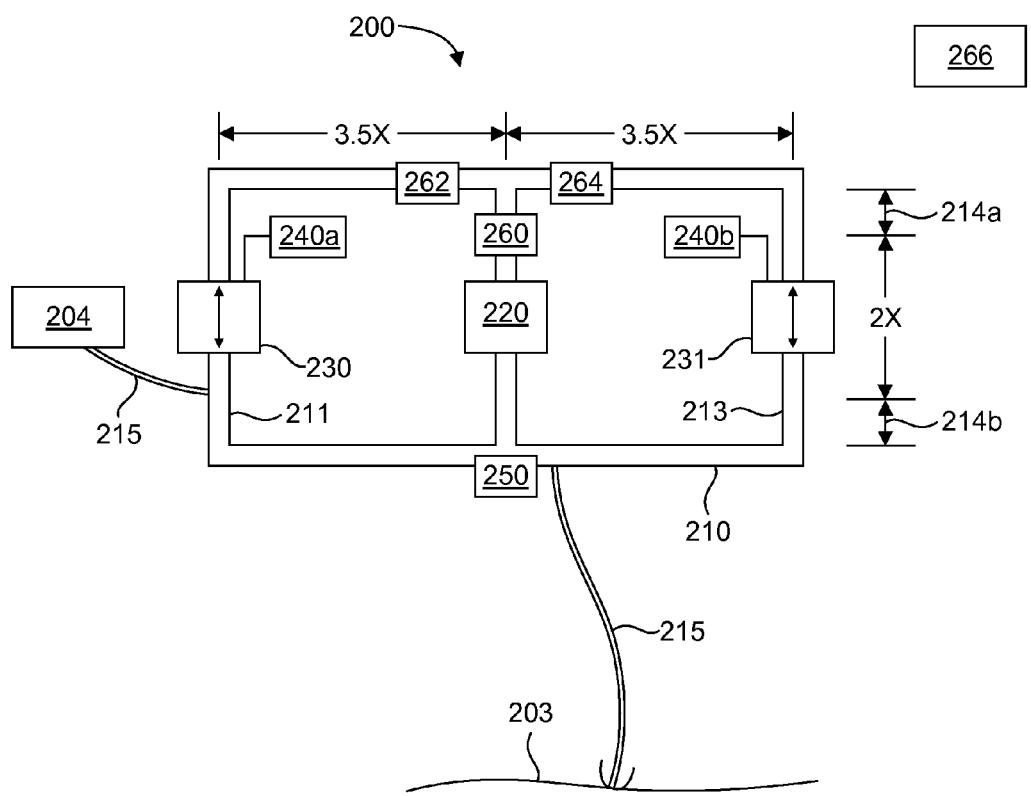
FIG. 2 illustrates an array of buoys for obtaining energy from a wave in a body of water, in accordance with another embodiment of the present disclosure.

With reference to FIG. 2, and continued reference to FIG. 1, an array of buoys 200 for obtaining energy from a wave in a body of water can be configured based on relationships to typical (design) wave expected to be encountered by the array of buoys. For example, it has been observed that typical deep water waves have a reasonably constant wave height and a wavelength relationship. Specifically, for a given wave height (X), the wave length is about seven times (7×) the wave height from peak to trough. In one aspect, the array of buoys can be designed for a specific wave height where the range of motion of the movable buoys relative to the vertical members is about two times (2×) the wave height. The base buoy can be configured to support the framework in the water to facilitate movement of the movable buoys up to two times the design wave height. In addition, the distance between the base buoy and a movable buoys can be from about two times the wave height (2× or 2:1 ratio) to about five times the wave height (5× or 5:1 ratio). In one particular aspect, the distance between the base buoy and a movable buoys is about three-and-a-half times the design wave (3.5× or 3.5:1 ratio). In this configuration, the base buoy can support the framework in the water such that the vertical floating movement of the movable buoys relative to the vertical members of the framework can move up to two times the design wave height.

The array of buoys can be used to obtain energy from water waves to produce energy through pumping water, pumping air, induction, or conversion through any other type of mechanical motion since each movable buoy can have attached to it an energy conversion device known in the art for converting mechanical motion into energy, such as a pump or electrical generator. It should be recognized that although the array of buoys can be designed for deep ocean water waves, other waves can alternatively be utilized.

In addition, each vertical member 211, 213 can have a height of two times (2×) the design wave height plus lengths 214a, 214b to accommodate variables such as the movable buoy height as well as a safety distance to provide additional clearance to minimize the chance of impact due to the fact that it is unlikely that each movable buoy will always float with the water exactly in the middle of the buoy height. Energy conversion devices 240a, 240b can be operable with the movable buoys 230, 231 to generate power from movement of the movable buoys relative to the vertical members.

A tether 215 can be coupled to the framework 210 to anchor the array of buoys 200 to an object, such as an ocean floor 203 or to an object 204 floating on a surface of the body of water such as a boat or oil rig. The tether can be configured to allow the array of buoys to move effectively in the water on the waves without permitting the array of buoys to stray too far from a desired location.

In one aspect, the array of buoys 200 can include a locomotion device 250 operable to move the array of buoys through the body of water. The locomotion device can be used to move the array of buoys to a desired location and/or to maintain the array of buoys at a desired position. For example, the locomotion device can be used to move the array of buoys from a deployment location, such as a dock, to a deep water location for harvesting energy. In one aspect, locomotion device can be also used to provide movement for a ship or other water vessel by coupling the array of buoys to the ship.

The array of buoys 200 can also include various systems useful for operating the array of buoys, such as a control system 260 operable to control operation of the array of buoys, a communication system 262 operable to communicate with a command center or base station, and/or a global positioning system (GPS) 264. For example, the control system can monitor various aspects of the array of buoys, such as the amount of energy generated. The communication system can communicate with a base 266, such as a command center located on land or on a ship. The GPS can monitor location of the array of buoys. Thus, the command center can receive data from the array of buoys as well as give operating instructions, such as a location to move to, etc. In response to such instructions, the locomotion device 250 can move the array of buoys to a location using the GPS for navigation.

The array of buoys 200 can be constructed of any suitable material. For example, typical structural materials suitable for marine use may be used, particularly those suitable for salt water applications when contemplating use in the ocean. In addition, the array of buoys can use hydrophobic materials on its surfaces so that any ice that forms during cold weather will shear and fall off the buoys and the framework as the array of buoys moves in the ocean, thereby preventing ice buildup.

Figure 3A:
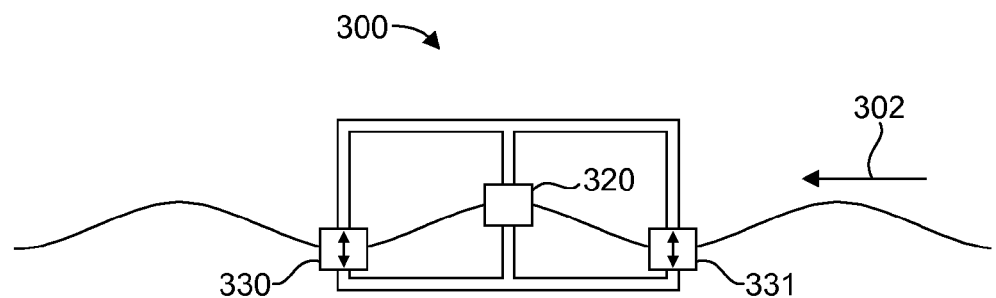
FIGS. 3A-3C illustrate an array of buoys in operation with waves of a typical or design size, in accordance with an embodiment of the present disclosure.
Figure 3B:
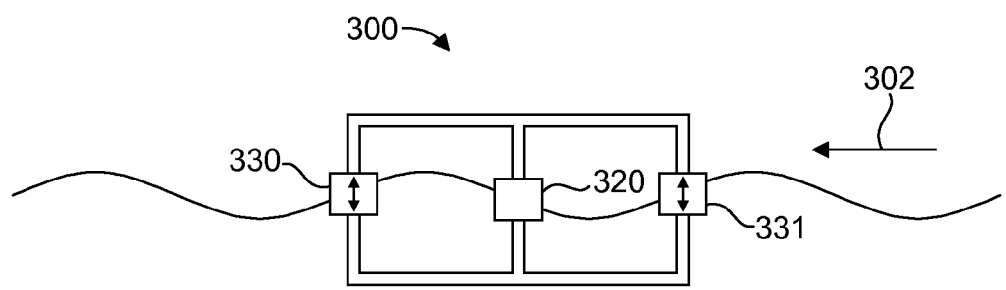
Figure 3C:
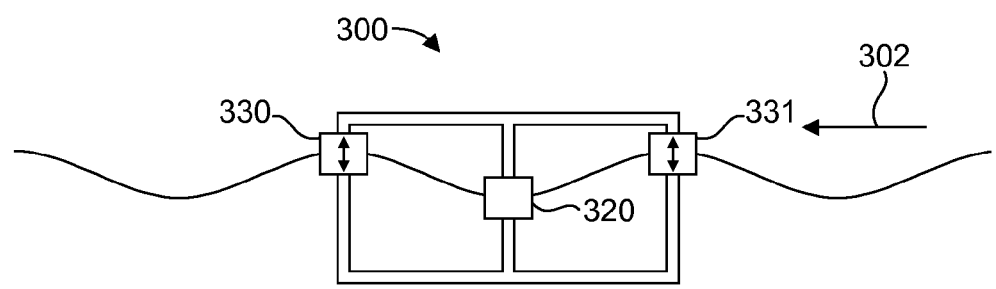

FIGS. 3A-3C illustrate an array of buoys 300 in operation with waves of a typical or design size. For example, as shown in FIG. 3A, the two movable buoys 330, 331 on opposite sides of the base buoy 320, at a distance from the base buoy as outlined above, are able to be at the lowest points, or troughs of a wave, while the base buoy 320 is at a highest point, or a crest of the wave. FIG. 3B shows the wave moving in direction 302 and causing the base buoy to fall off the crest while the movable buoys ride up out of the troughs toward crests. When the wave moves a distance of three-and-a-half wave heights, as shown in FIG. 3C, the movable buoys have switched vertical positions so that the movable buoys are at crests of a wave and the base buoy is at a trough. This creates a total vertical movement for each movable buoy along the vertical member associated with the movable buoy of two times the wave height.

Figure 4A:
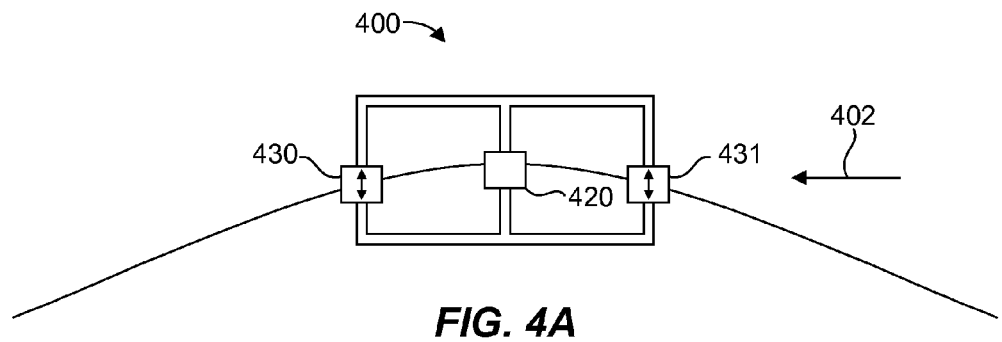
FIGS. 4A-4C illustrate an array of buoys in operation with waves that exceed a typical or design wave size, such as a rogue wave, in accordance with an embodiment of the present disclosure.
Figure 4B:
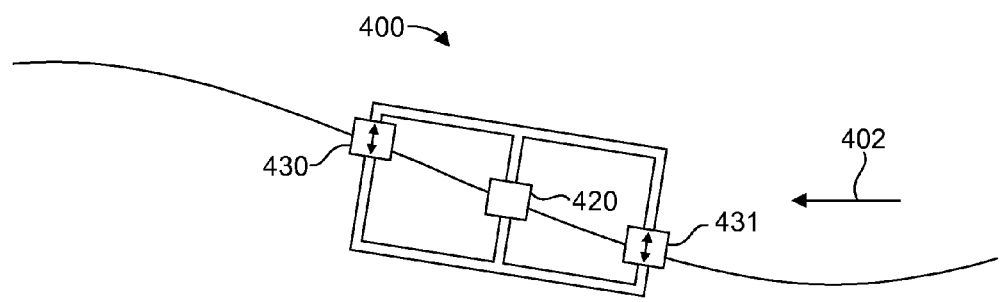
Figure 4C:
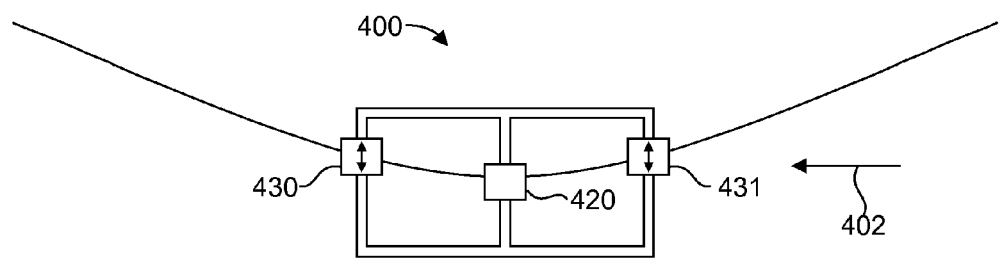

FIGS. 4A-4C illustrate an array of buoys 400 in operation with waves that exceed a typical or design wave size, such as a rogue wave. For example, as shown in FIG. 4A, the base buoy 420 lifts the entire array of buoys up on the crest of the wave, with the two movable buoys 430, 431 on opposite sides of the base buoy 420 on either side of the crest of the wave. FIG. 4B shows the wave moving in direction 402 and causing the array of buoys to fall off the crest of the wave. The movable buoys float on the wave such that movable buoy 430 tends to rise relative to the vertical member of the framework while movable buoy 431 tends to fall relative to the vertical member of the framework. In the event that the framework becomes unstable, the framework may tip causing the movable buoy to rise up the vertical member until it has reached the end of the range of motion, at which point it will prevent further tipping of the framework. Thus, the array of buoys can effectively ride up or down a large wave without tipping over. As shown in FIG. 4C, upon the base buoy reaching the trough of the wave, the movable buoys have moved up relative to the vertical members. The array of buoys can operate in any size wave by riding the slope of the wave and can therefore keep operating through hurricanes and tsunamis without damage. No matter how high the waves get, the buoys can keep floating and move without collision or damaging movement. No braking method or stop motion is required for extremely large ocean waves.

The array of buoys can produce the same amount of energy whenever the ocean waves are higher than or equal to the designed wavelength for the array. This permits a system to be designed for a specific capacity without wide fluctuations in performance as long as the actual wave height is greater than or equal to the wave height for which the array 1 has been designed. Such attributes are attractive for using an array of buoys as primary power, replacing nuclear, petroleum, natural gas, or coal plants. There is no need to vary the size of the framework to accommodate ocean depth differences which impacts other ocean wave devices which are attached to the ocean floor. Every device can be the same, thereby creating cost savings and improving manufacturability. In addition, because the entire array of buoys floats, operation in deep ocean waves is enabled. This allows placement of the device far from land so that deep ocean waves, which are larger than those close to shore, can be harvested for energy, and avoids cluttering the coastal waterways or taking up real estate used for tourism.

Figure 5:
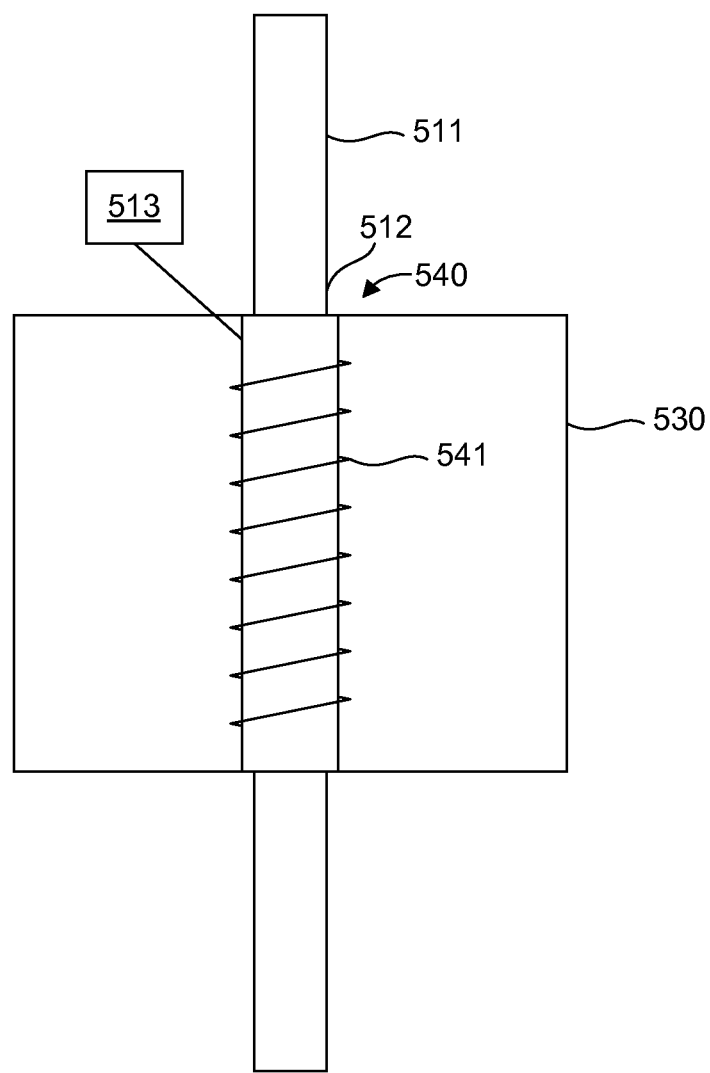
FIG. 5 illustrates an energy conversion device that is operable with a movable buoy to generate power from movement of the movable buoy, in accordance with an embodiment of the present disclosure.

FIG. 5 illustrates an example of an energy conversion device 540 that is operable with a movable buoy 530 to generate power from movement of the movable buoy relative to a vertical member 511. In this example, the energy conversion device comprises an inductor that generates electricity via electromagnetic induction. The inductor includes a coil 541 of conducting material, such as copper wire. The vertical member 511 includes a ferromagnetic or ferromagnetic material within the range of motion of the movable buoy to form a core 512 for the inductor. Thus, relative motion of the movable buoy causes the coil to move relative to the core and generating electricity. The electricity can be used or stored, indicated at block 513, as desired.

Figure 6:
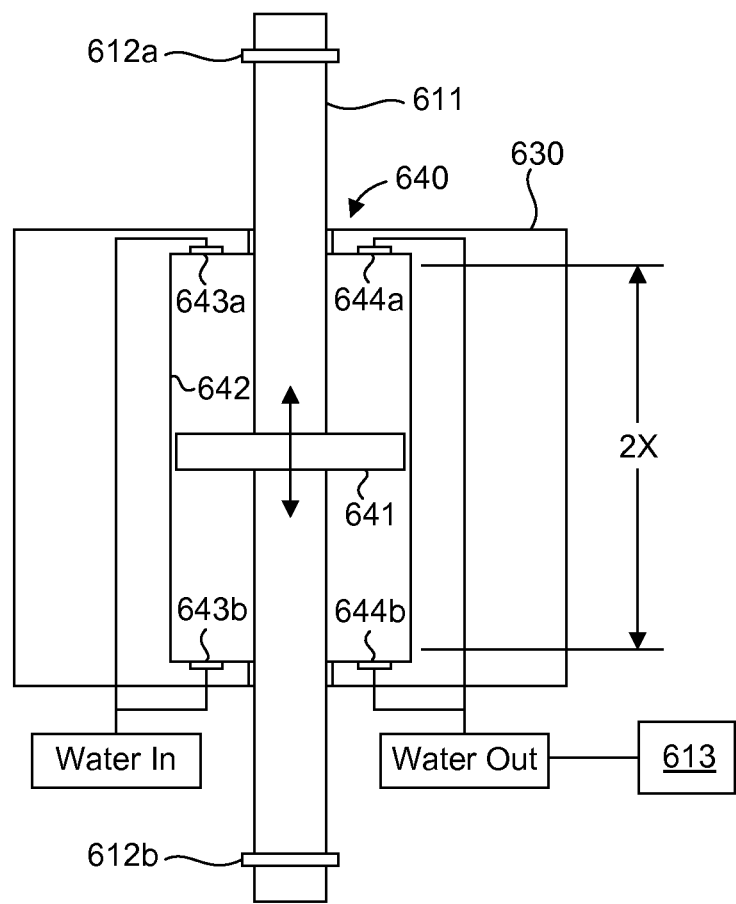
FIG. 6 illustrates an energy conversion device that is operable with a movable buoy to generate power from movement of the movable buoy, in accordance with another embodiment of the present disclosure.

FIG. 6 illustrates another example of an energy conversion device 640. In this example, the energy conversion device comprises a pump that utilizes a piston 641 coupled to a vertical member 611 that moves within a cylinder 642 associated with a movable buoy 630. The pump includes one-way inlet valves 643a, 643b and outlet valves 644a, 644b to regulate the flow of water through the pump. The pump can be configured to have a maximum stroke of two times the design wave height, which can be limited by stops 612a, 612b on the vertical member. Thus, relative motion of the movable buoy causes the piston to move relative to the cylinder and pumping water. The pumped water can be used to generate electricity, to turn a propeller for locomotion of the array of buoys, to provide water pressure for locomotion via water jets, to pump water out of flood zones for hurricane protection, or any other suitable use as desired, indicated at block 613.

For the hydroelectric generation of energy, water can be pumped from one or more arrays of buoys to a floating hydroelectric generator or pumped to a land-based hydroelectric generator. Water can be pumped up into a floating water tower (so that many small pumps can pump water without working against each other) to provide water pressure for the hydroelectric generator. This option would, for example, allow the quick conversions of troubled or deficient energy sources, to ocean wave energy. For example, many nuclear reactors are built close to the coast. For these reactors, water from ocean waves can be pumped to turn existing generators which were initially designed to be run by steam produced by a nuclear reactor. These generators can be converted to run as a result of pumped water. For desalination plants, water can be pumped from one or more arrays of buoys to a reverse osmosis plant to create fresh water from salt water. Also, the array of buoys can be used to provide remote power to oil rigs, undeveloped areas, and locations where disaster relief is needed.

It is noted that if the desire is to pump water using the systems and methods described herein, a combination of an electricity generator (as in FIG. 5) can be used to generate electricity by induction, and the electrical power can be used to run a conventional water pump. This may be a more simple way of moving water, rather than having more complicated pistons, one way valves, etc., described with respect to FIG. 6.

Figure 7A:
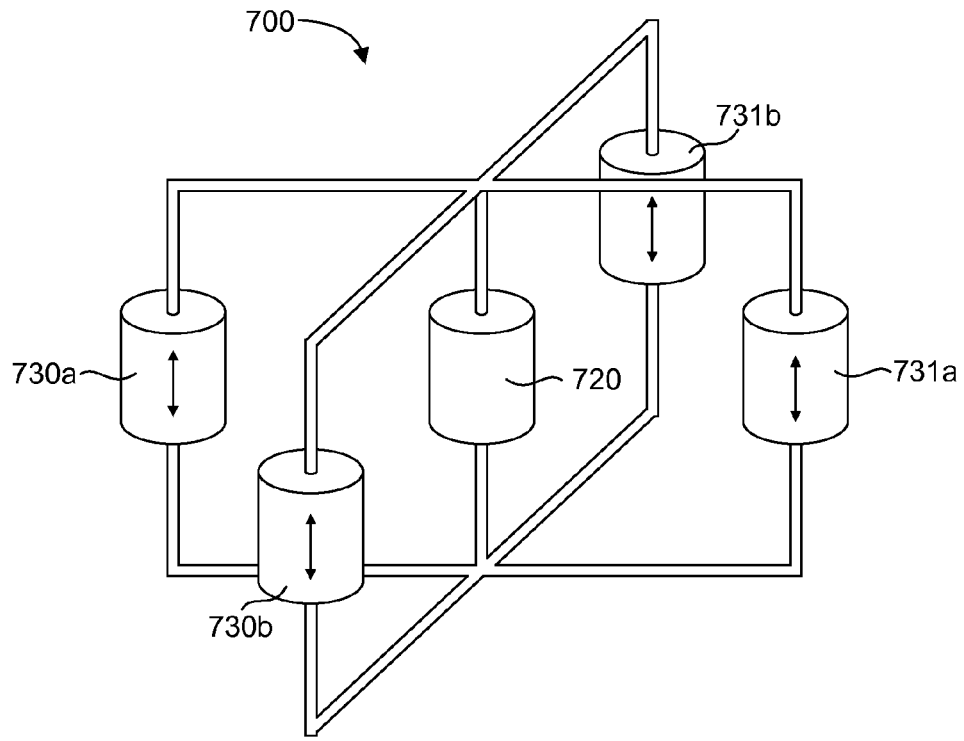
FIGS. 7A and 7B illustrate a cross configuration for maintaining stability of an array of buoys in the water, in accordance with an embodiment of the present disclosure.
Figure 7B:
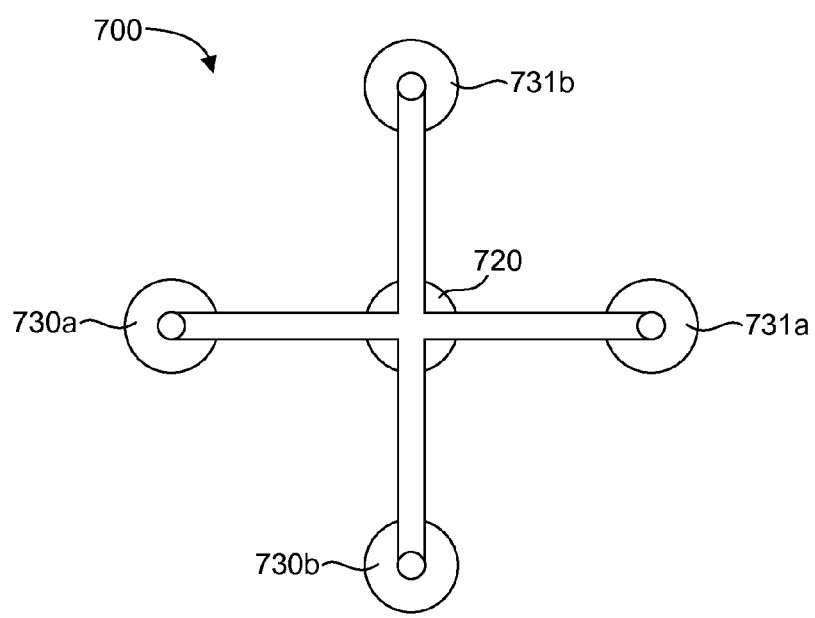

FIGS. 7A and 7B illustrate a cross configuration for maintaining stability of an array of buoys 700 in the water. Here, the base buoy 720 and the plurality of movable buoys 730a, 731a, 730b, 731b are arranged in a cross configuration with the base buoy disposed at a center of the cross configuration. The cross configuration locates movable buoys extending out in four opposite directions from the base buoy to provide floatation stability for the array of buoys. The cross configuration also enables energy harvesting vertical motion of the movable buoys from waves encountering the array of buoys from multiple directions.

Figure 8A:
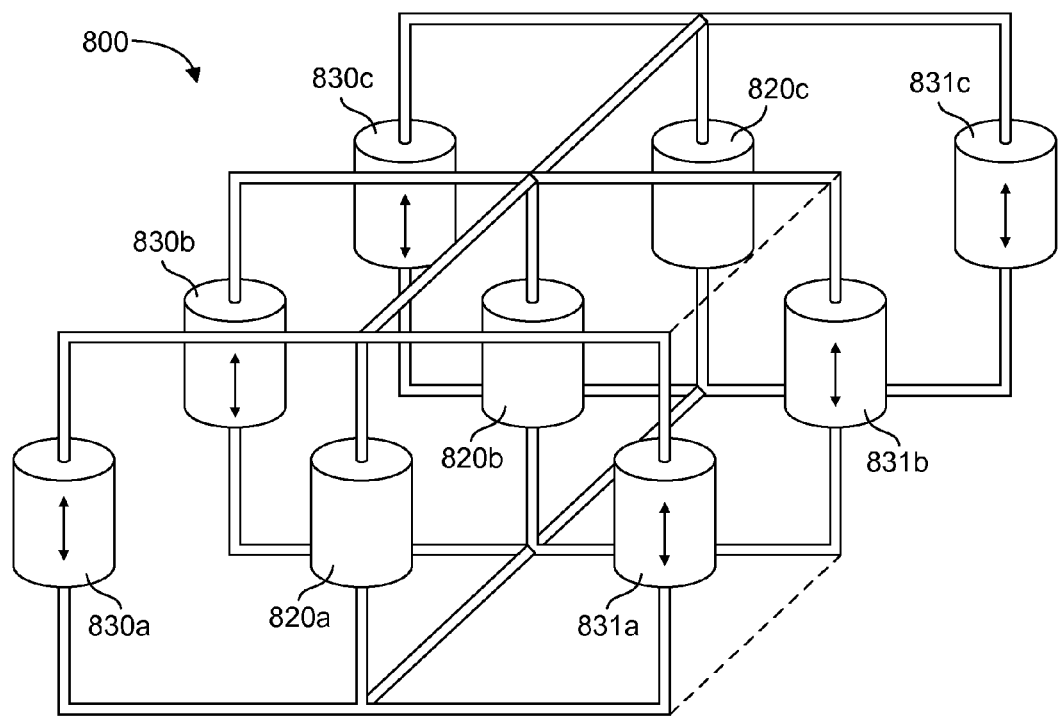
FIGS. 8A and 8B illustrate a configuration for maintaining stability of an array of buoys in the water as well as for extending the array to include any number of movable buoys and/or base buoys, in accordance with an embodiment of the present disclosure.
Figure 8B:
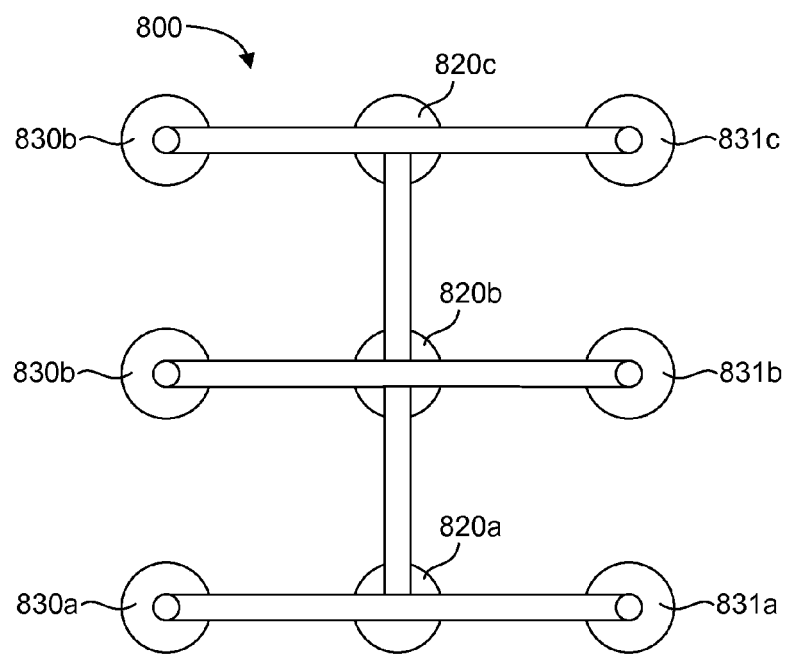

FIGS. 8A and 8B illustrate a configuration for maintaining stability of an array of buoys 800 in the water as well as for extending the array to include any number of movable buoys and/or base buoys. For example, a base buoy 820a can be associated with one or more movable buoys 830a, 831a in a positional relationship as disclosed herein. This basic arrangement can be repeated any number of times to expand or enlarge the array, as illustrated with base buoys 820b and 820c, and movable buoys 830b, 831b and 830c, 831c, respectively. The base buoys can serve as stabilizing buoys for the array. The base buoys can be connected by one or more framework members, such as lateral members 816a, 816b. Alternatively, or in addition, the base buoys can be connected by one or more lateral framework members 817a, 817b that extend between framework portions proximate to movable buoys. In one aspect, the lateral framework members connecting base buoys can form rigid connections or pivoting connections. A pivoting connection may result in reduced stress on the framework as an array grows in size by allowing the base members to move relative to one another to follow a wave without suspending a base member in the air above the water. In this case, a range of motion for a pivoting connection can be limited to prevent the framework from folding up and collapsing or damaging components of the array. It should be appreciated that the various components of an array of buoys can be arranged to provide stability and/or expand the number of base buoys and/or movable buoys in the array utilizing the concepts and positional relationships disclosed herein.

Figure 9:
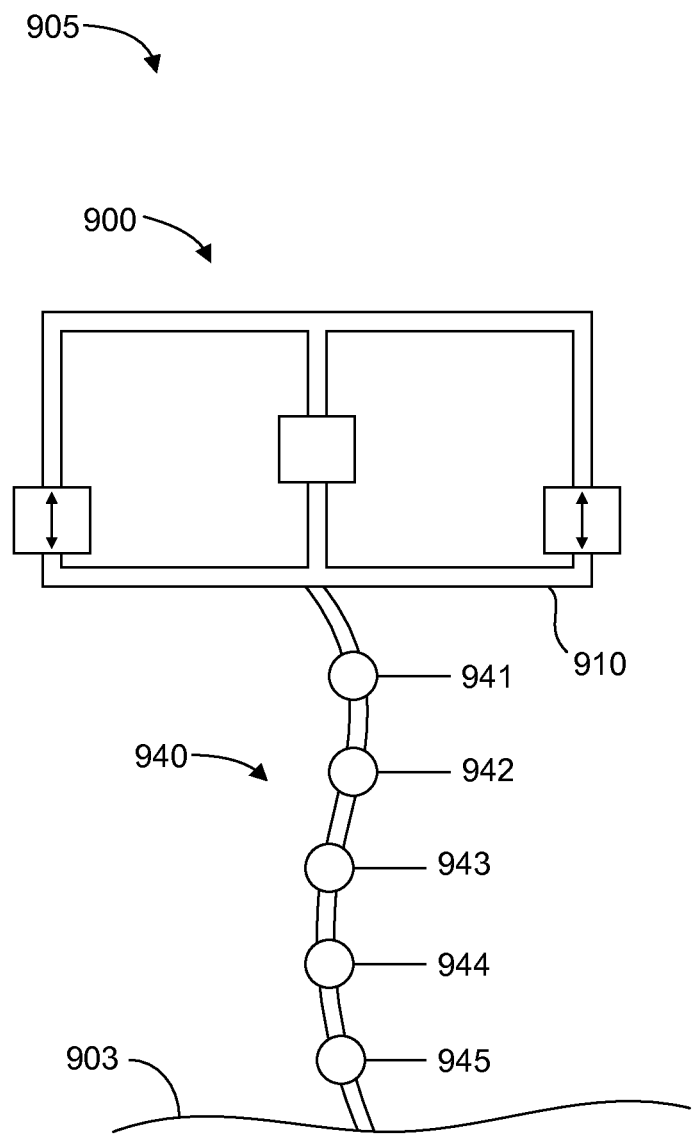
FIG. 9 illustrates a system for obtaining energy from surface waves, in accordance with an embodiment of the present disclosure.
Figure 10:
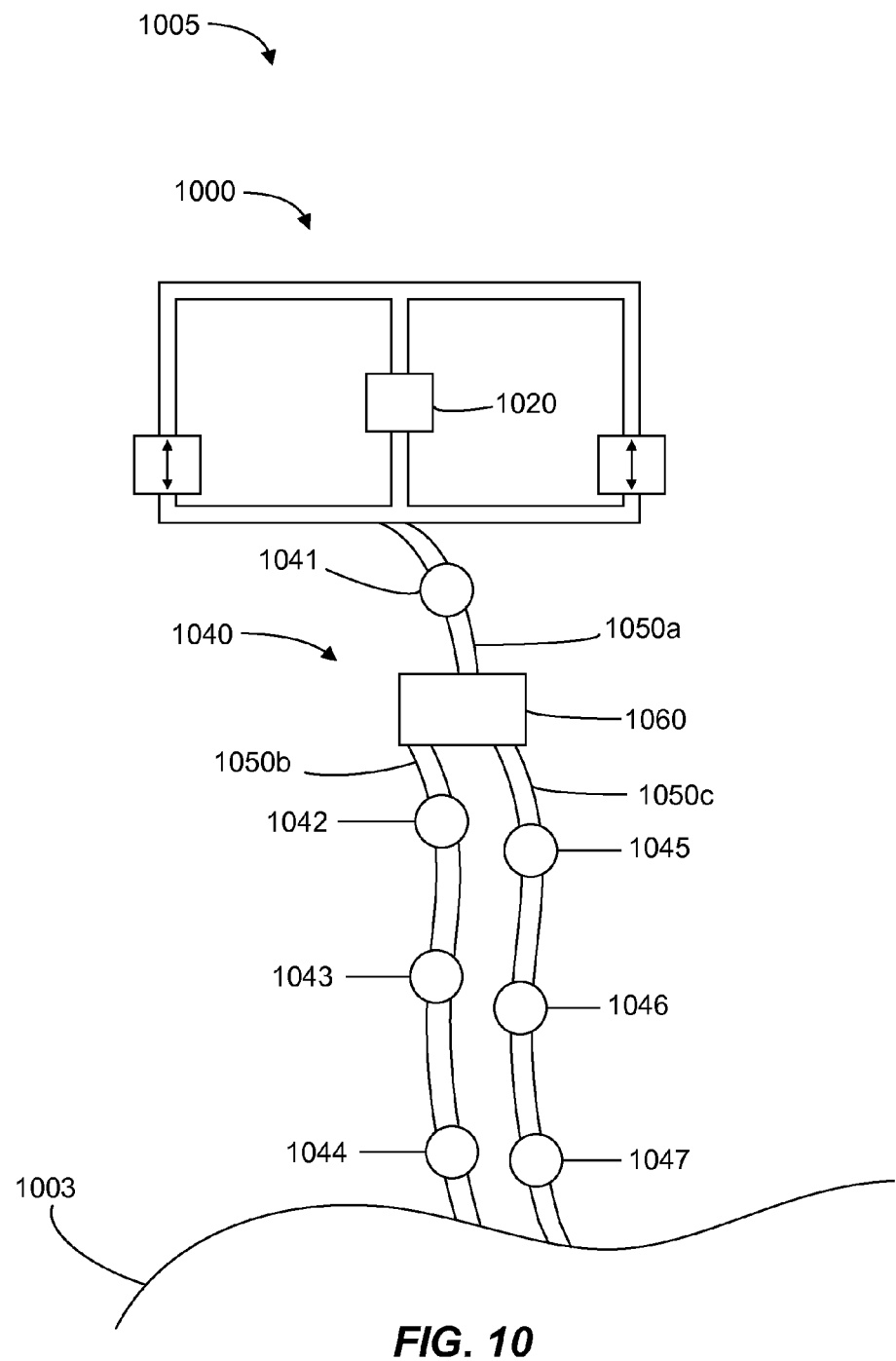
FIG. 10 illustrates a system for obtaining energy from surface waves, in accordance with another embodiment of the present disclosure.

FIGS. 9 and 10 each illustrate a system for obtaining energy from surface waves, comprising an array of buoys coupled to a buoyant tether, which can be used to secure or attach an array of buoys to an object, such as the ocean floor or a floating support of some type, such as a ship or oil rig. A buoyant tether as disclosed herein can therefore serve as a mooring line, a tow line, or any other suitable type of tether.

FIG. 9 illustrates a system 905 having an array of buoys 900 coupled to a tether 940 and secured or attached to an object 903, similar to that shown in FIG. 2. However, in this example, the tether is a buoyant tether which includes a plurality of attached buoyancy devices 941, 942, 943, 944, 945 coupled along the length of the buoyant tether. Other structures are similar to those previously described, such as in FIGS. 1-4C. In FIG. 9, however, the attached buoyancy devices can be constructed of any suitable buoyant material and can be coupled to the buoyant tether at any position. By contrast, the buoyant tether need not comprise attached buoyancy devices, but can comprise built in buoyancy. In one aspect, the buoyant tether 940 can be coupled to the array of buoys 900 via a framework 910 of the array of buoys.

In further detail, the buoyant tether 940 can comprise a cable or a utility line. The utility line can transfer electricity, pumped fluid, or gas to or from the array of buoys. In very deep water, a very long cable or utility line might otherwise exert considerable drag on the array of buoys, which could reduce the movement of the moveable buoys and thereby reduce the amount of energy captured by the array of buoys. The mass of the cable or utility line can be supported by built in buoyancy or attached buoyancy devices. Such support will reduce the peak load which would exist at the top of the cable or utility line where it connects to the array of buoys, which can thereby increase the life of the cable or utility line and reduce the risk of breakage or other damage during rough weather. In further detail regarding the buoyant tether, by providing a self-supporting tether in the water with respect to its own weight or mass, movable buoys of the array of buoys can move with freedom up and down with the ocean waves without losing momentum, e.g., a heavy or non-buoyant tether may cause the array of buoys to be being forced into a submersed or partially submersed state, diminishing the effectiveness of the device.

FIG. 10 illustrates a system 1005 having an array of buoys 1000 coupled to a buoyant tether 1040, again, similar to that shown in FIG. 2. However, in this example, the buoyant tether 1040 comprises a primary buoyant tether 1050*a* and a plurality of secondary buoyant tethers 1050*b* and 1050*c* which act to secure the array of buoys to an object 1003. In this example, the secondary buoyant tethers 1050*b*, 1050*c* are coupled to the primary buoyant tether 1050*a* via a tensioner 1060, which can facilitate load sharing among the secondary tethers. The tensioner 1060 can include a bungee cord, spring, shock, etc. attached across a loop in the tether cable allowing force from a base buoy 1020 to pull the bungee cord, spring, or shock to release additional line for the tether, thus facilitating a change in the tether length, which can allow adjustment of the tether to compensate for changing ocean height due to waves and tides. As illustrated, the primary buoyant tether and the plurality of secondary buoyant tethers are supported by attached buoyancy devices 1041, 1042, 1043, 1044, 1045, 1046, and 1047. The attached buoyancy devices can be constructed of any suitable buoyant material. Further, at least one of the primary buoyant tether and the secondary buoyant tethers can be constructed of buoyant material or comprise built in buoyancy.

The tensioner 1060 can couple the primary buoyant tether 1050*a* to the plurality of secondary buoyant tethers 1050*b*, 1050*c*. During storms and rough ocean waves, large wind loads, currents, and/or wave action, the array of buoys can be battered about. Some larger arrays of buoys can benefit from multiple tethers to reduce the peak loads on the tether as a whole and to prevent breakage and loss of moorings. Attaching one or more tensioners to the primary buoyant tether enables the system 1005 to load share the force across a plurality of secondary buoyant tethers. In further detail, there can be multiple tethers that couple at different locations on the array of buoys, or can couple to separate arrays of buoys, either through a tensioner or directly to the object or ocean floor. Each tether can have its own electrical connection to an inductor of an energy conversion device, or the tethers can be connected electrically together, such as in series or in parallel.

Figure 11A:
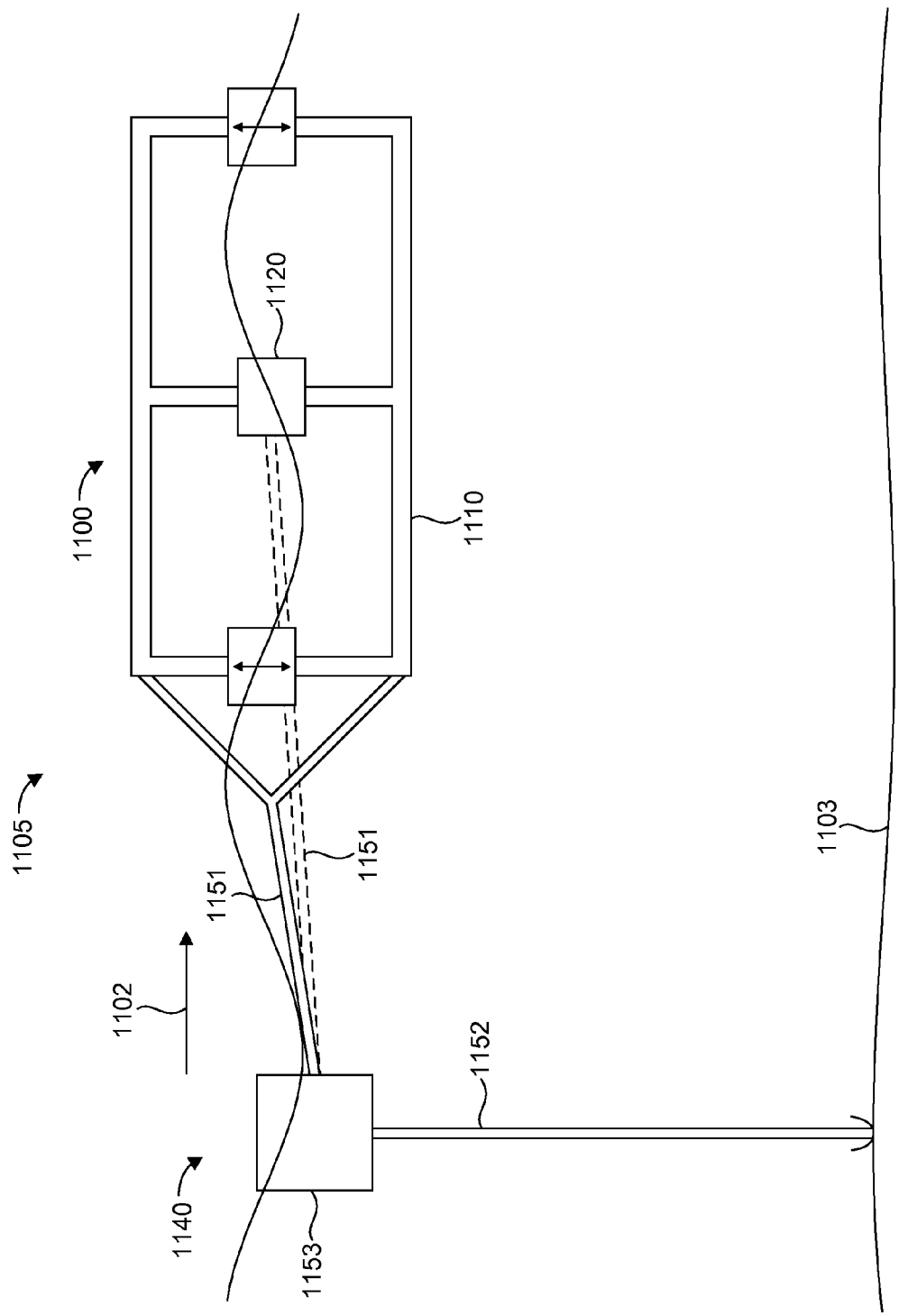
FIG. 11A illustrates a system for obtaining energy from surface waves, in accordance with yet another embodiment of the present disclosure.

FIG. 11A illustrates a system 1105 for obtaining energy from surface waves in accordance with another example of the present disclosure. As with other examples described herein, the system 1105 can include an array of buoys 1100 and a buoyant tether 1140 coupled to the array of buoys. In this case, the buoyant tether can include a lateral tether portion 1151 coupled to the array of buoys, a vertical tether portion 1152 to attach to an object 1103 (e.g., a mooring line to the ocean floor), and a lateral support buoy 1153 coupled between the lateral tether portion and the vertical tether portion. The buoyant tether can be coupled to the array of buoys via a framework 1110 and/or a base buoy 1120 of the array of buoys. In one aspect, the lateral support buoy 1153 can substantially provide buoyancy for the lateral tether and/or the vertical tether. Thus, the lateral support buoy 1153 can support the weight of a tether/utility line going to the ocean floor. Waves propagating in direction 1102 can cause the array of buoys 1100 to be oriented away from the lateral support buoy 1153, thus extending the lateral tether portion substantially horizontal in the same direction due to the attachment of the vertical tether portion 1152 to the ocean floor. Running the lateral tether portion from the array of buoys 1100 horizontally to the lateral support buoy can allow the array of buoys to "fly" on the ocean surface much like a kite on the wind, allowing movement of the array of buoys with the ocean waves in a substantially vertical direction, which is in the same direction as buoyant forces acting on the buoys. This tethering configuration can therefore closely align the buoy motion with the direction of buoyant forces acting on the buoys. This tethering configuration can have advantages over other tethering configurations. For example, in some tethering configurations, an array of buoys is tethered directly or straight downward to the ocean floor (see, e.g., FIG. 2) causing the array of buoys to support at least some of the mass of the tether, which creates a resistance force countering the up/down movement of buoyant forces causing the buoy to tilt at an angle. Supporting the vertical or mooring tethering portion 1152 with the lateral support buoy 1153, as in FIG. 11A, can reduce or minimize the tilting effect or misalignment of buoy movement and buoyant force direction, such as can occur with other tethering configurations. In one aspect, as described above, the lateral tether 1151 and/or the vertical tether 1152 can comprise an attached buoyancy device coupled thereto and/or have built in buoyancy.

FIG. 11B illustrates the system 1105 when subjected to an extreme wave. As shown in the figure, by having the lateral tether portion 1151 coupled to the tether support buoy 1153, which is coupled to the ocean floor 1103 via the vertical tether portion 1152, the array of buoys 1100 can be prevented from "surfing" down the slope of the wave and snapping the tether line at the bottom of the wave. With this configuration, slack in the lateral tether portion 1151 is removed as the array of buoys 1100 rides a wave, thus preventing or minimizing horizontal speed/motion of the array of buoys. The lateral tether portion 1151 can therefore hold the horizontal position of the array of buoys 1100 and counteract the surfing force acting on the array of buoys caused by the wave propagating in direction 1102. The lateral tether portion 1151 can also hold the leading edge of the array of buoys 1100 so that breaking waves will crash over and not lift up or flip the array of buoys.

Although the tether configuration illustrated in FIGS. 11A and 11B can help the array of buoys survive an extreme wave, a site survey can be performed, such as through archives and satellite data, to identify areas that are prone to extreme waves (i.e., waves greater than 30 m tall with unusually steep slopes) so that power production sites can be located in areas where there is a lower risk of an extreme wave.

Figure 12A:
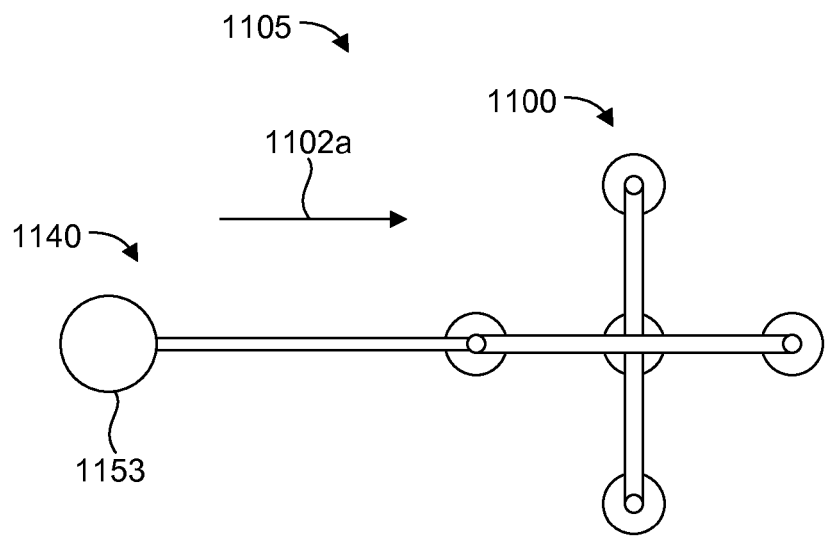
FIGS. 12A and 12B illustrate the system of FIG. 11A aligning with varying wind/wave directions.
Figure 12B:
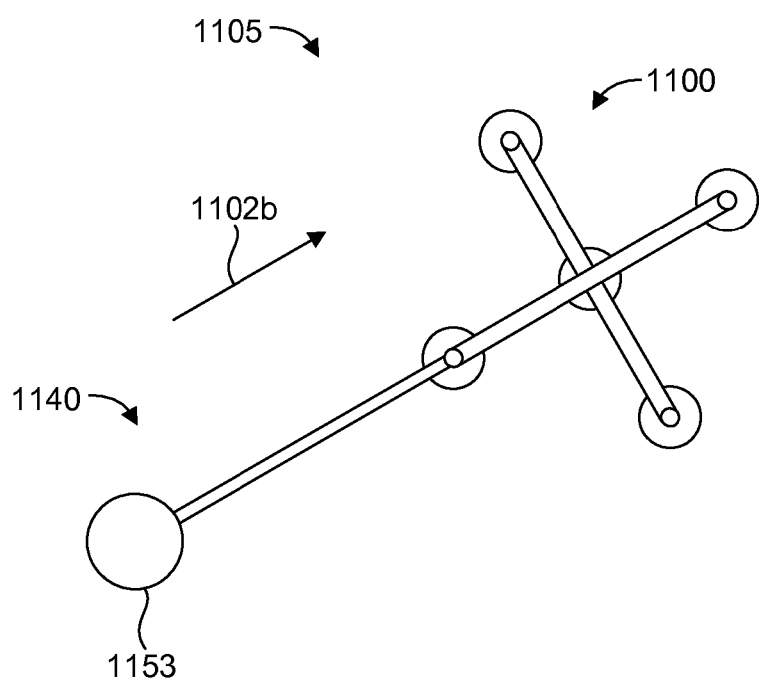

The tether configuration illustrated in FIGS. 11A and 11B can also facilitate alignment of the tether 1140 and the array of buoys 1100 with the direction of waves (i.e. currents)

and/or wind. For example, as shown in the top view of the system 1105 in FIG. 12A, due to the anchoring location of the system being substantially below the lateral support buoy 1153, wind/waves in direction 1102a can orient the system 1105 such that the tether 1140 and the array of buoys 1100 are aligned with the wind/waves. As the wind/waves change to direction 1102b, as shown in FIG. 12B, the system 1105 can pivot about the anchoring point located below the lateral support buoy 1153 such that orientation of the system can align with the wind/wave direction 1102b.

Figure 13A:
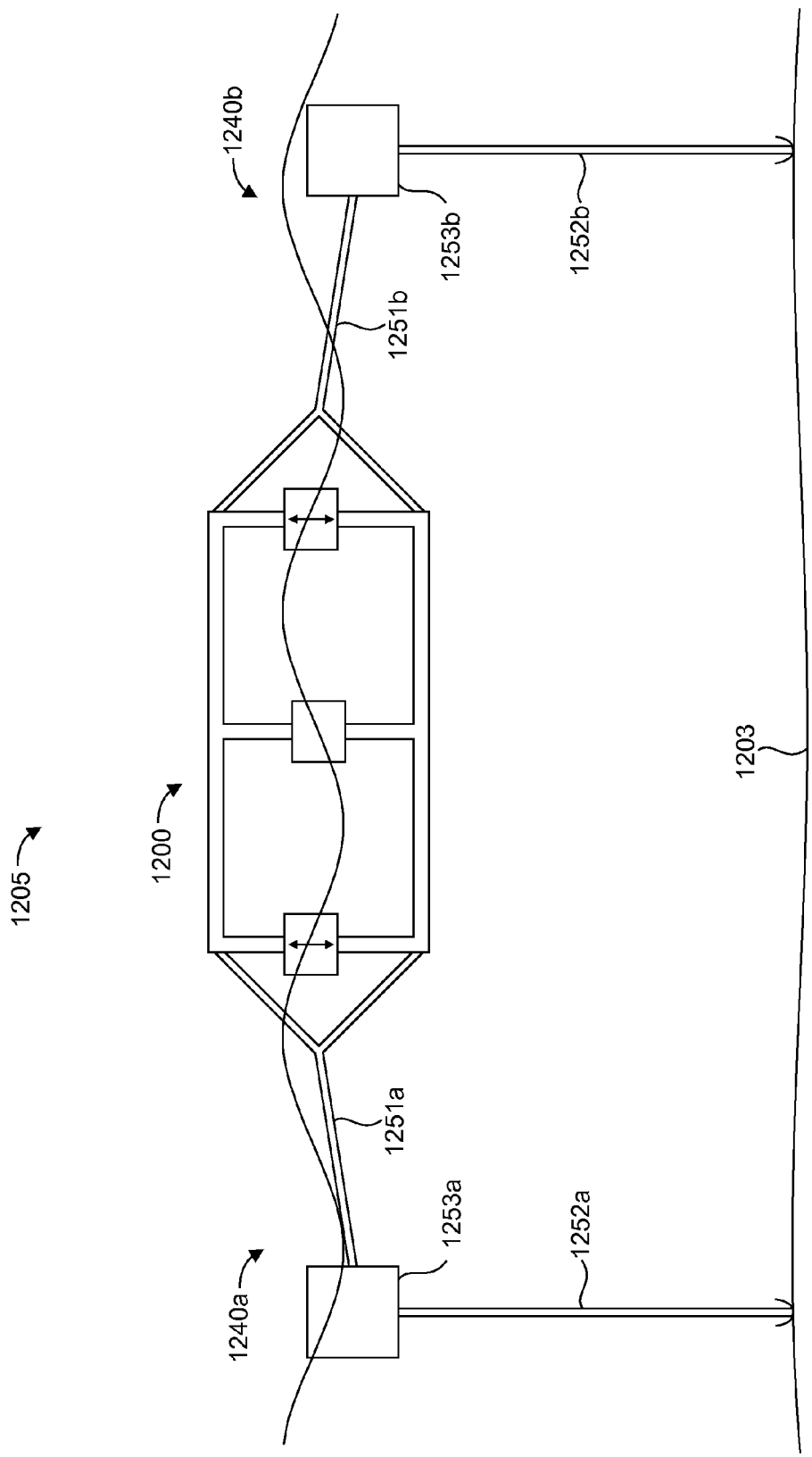
FIG. 13A illustrates a system for obtaining energy from surface waves, in accordance with still another embodiment of the present disclosure.

FIG. 13A illustrates a system 1205 for obtaining energy from surface waves in accordance with yet another example of the present disclosure. As with other examples described herein, the system 1205 can include an array of buoys 1200 and a buoyant tether 1240a coupled to the array of buoys. In this case, another buoyant tether 1240b can also be coupled to the array of buoys to provide additional stability when coupling to an object 1203, such as an ocean floor. The buoyant tethers 1240a, 1240b can be of similar configuration, having lateral tether portions 1251a, 1251b coupled to the array of buoys, vertical tether portions 1252a, 1252b to attach to the ocean floor, and lateral support buoys 1253a, 1253b coupled between the second lateral tether portions and the second vertical tether portions. As shown in the figure, the buoyant tethers 1240a, 1240b are coupled to the array of buoys about opposite sides, although the buoyant tethers can be in any suitable relative position when coupled to the array of buoys.

Figure 13B:
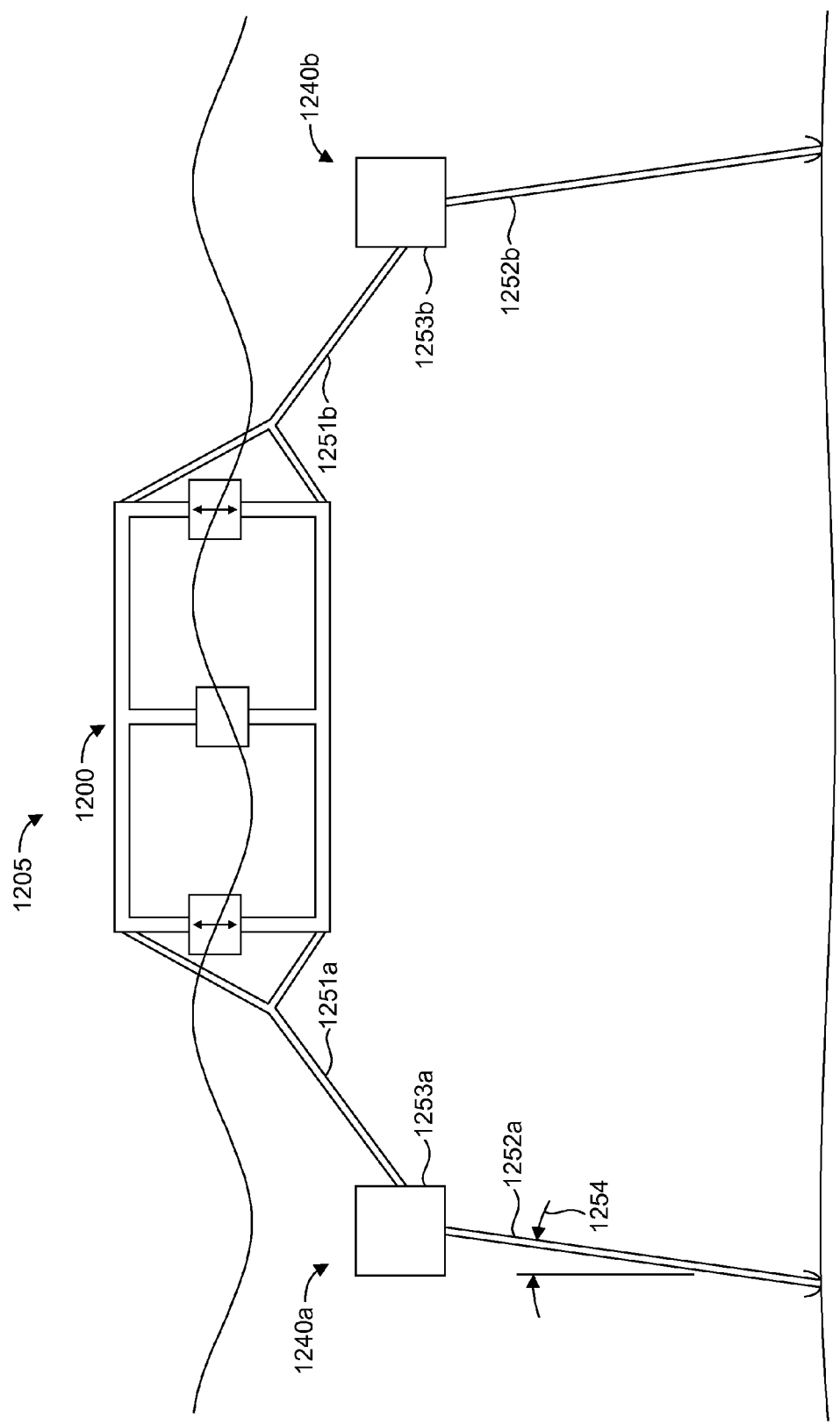
FIG. 13B illustrates the system of FIG. 13A when at high tide.

In one aspect, FIG. 13A can represent the system 1205 when the ocean is at low tide. In this case, the lateral support buoys 1253a, 1253b can be just under the water level with the vertical tether portions 1252a, 1252b in a vertical orientation. FIG. 13B can represent the system 1205 when the ocean is at high tide. In this case, the lateral support buoys 1253a, 1253b can lean in toward the array of buoys 1200 changing the orientation of the vertical tether portions 1252a, 1252b from vertical (FIG. 13A) to an angle 1254 off of vertical (FIG. 13B) by keeping the tethers 1240a, 1240b under tension and reducing or eliminating slack that may exist in the tethers as wave conditions change from low to high tide. A length of the lateral tether portions 1251a, 1251b can be increased to improve performance.

Figure 13C:
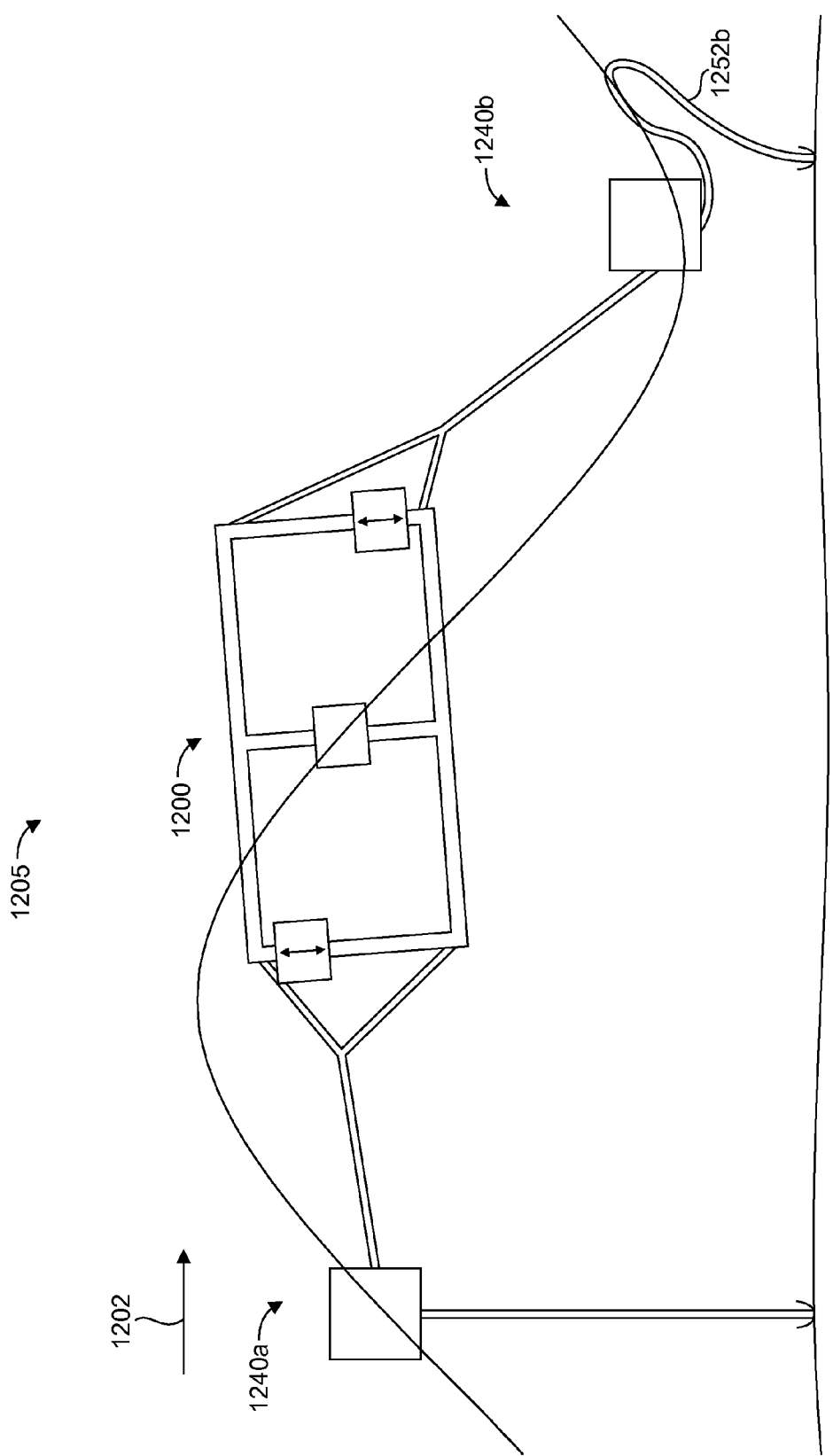
FIG. 13C illustrates the system of FIG. 13A when subjected to an extreme wave.

FIG. 13C illustrates the system 1205 when subjected to an extreme wave. As with the system 1105 illustrated in FIG. 11B, the lateral buoyant tether 1240a of the system 1205 can be configured to hold the horizontal position of the array of buoys 1200 and counteract the surfing force acting on the array of buoys caused by the wave propagating in direction 1202. In this case, the buoyant tether 1240b can go slack, or a tensioner can reduce the length of tether to eliminate the slack, while the wave passes the tether 1240b and the array of buoys is being supported by the tether 1240a. The vertical tether portion 1252b can float if configured with buoyant devices or if it has built in buoyancy. In one aspect, the buoyant tethers 1240a, 1240b can provide support for the array of buoys 1200 against waves propagating in different directions.

Figure 14:
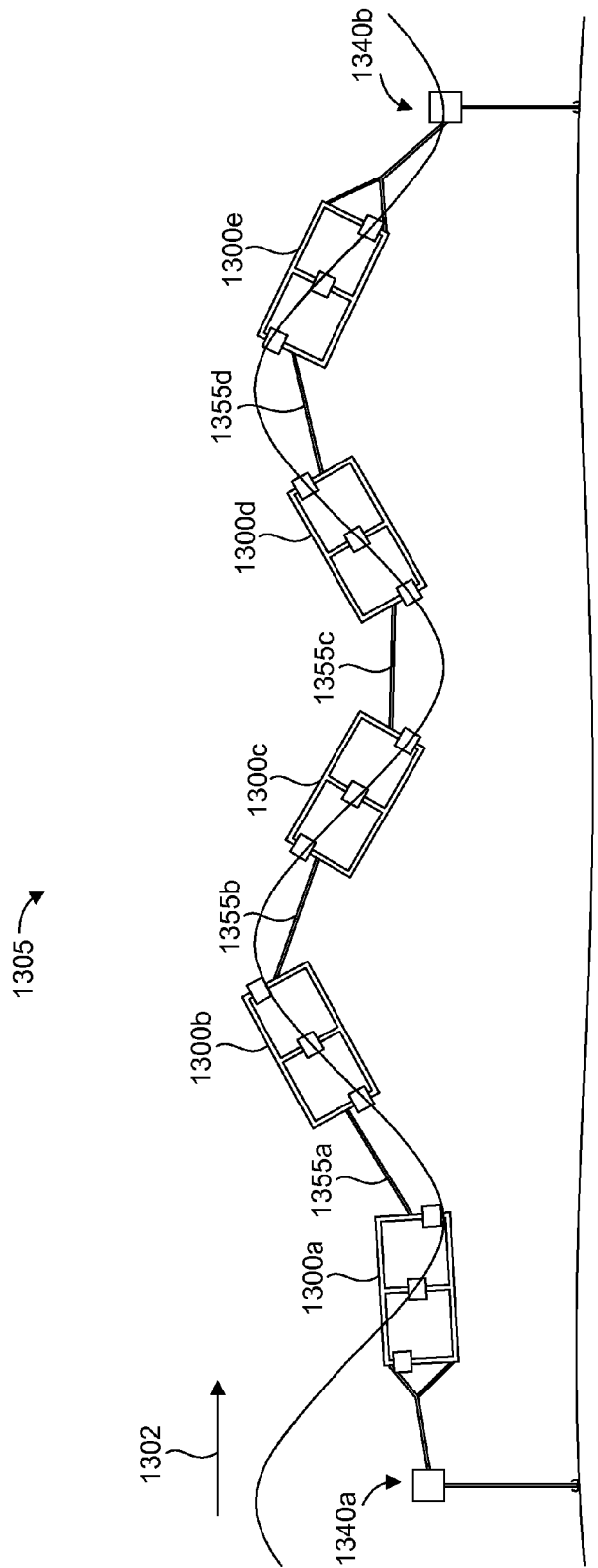
FIG. 14 illustrates a system for obtaining energy from surface waves, in accordance with still another embodiment of the present disclosure.

FIG. 14 illustrates a system 1305 for obtaining energy from surface waves in accordance with still another example of the present disclosure. In this case, the system 1305 includes multiple arrays of buoys 1300a-e coupled to one another with lateral tethers 1355a-d in a linear arrangement. The lateral tethers 1355a-d can be attached to the array of buoys at interior or center members of the frameworks and/or to outside members of the frameworks. One or more buoyant tethers can be coupled to the arrays of buoys. For example, buoyant tethers 1340a, 1340b can be coupled to the arrays of buoys 1300a, 1300e, respectively, at opposite ends of the linear arrangement to provide support for the multiple arrays of buoys 1300a-e against a wave, such as a wave propagating in direction 1302. In one aspect, the buoyant tethers 1340a, 1340b can provide support for the multiple arrays of buoys 1300a-e against waves propagating in different directions.

Figure 15A:
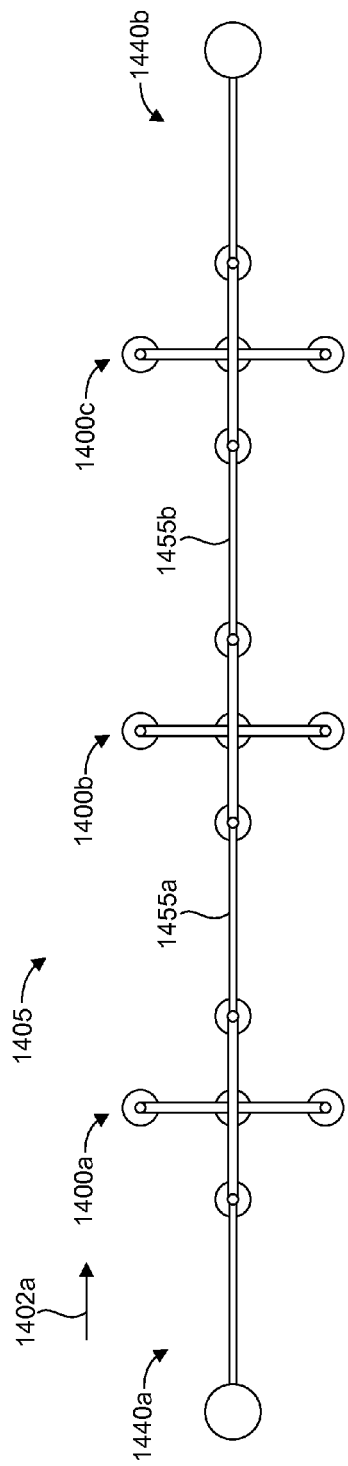
FIGS. 15A and 15B illustrate a system for obtaining energy from surface waves in accordance with a further example of the present disclosure.
Figure 15B:
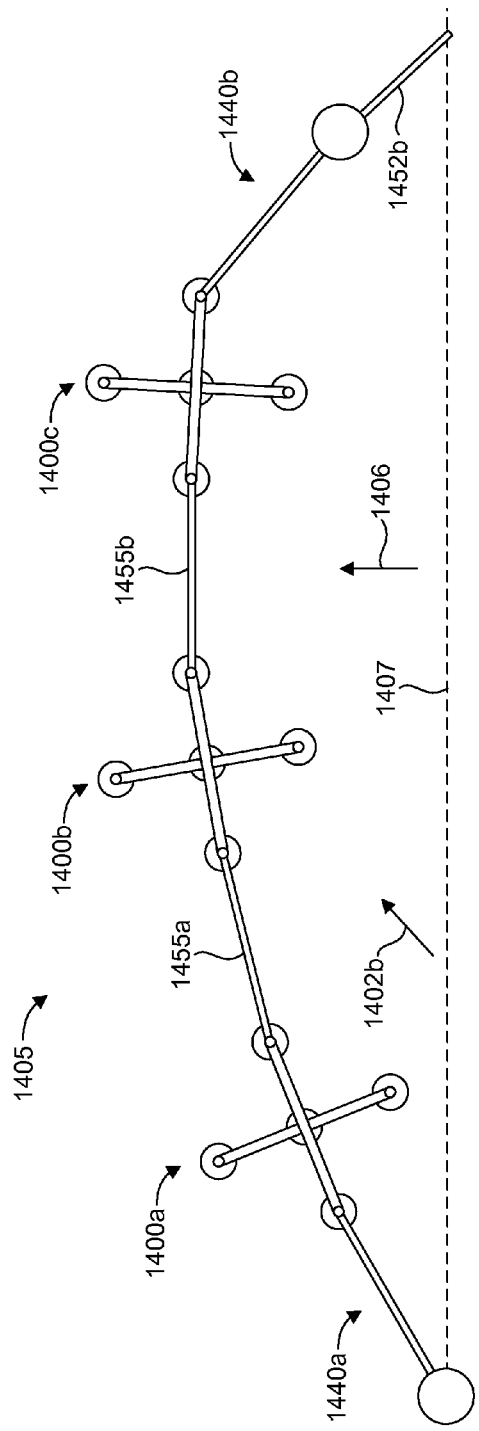

FIGS. 15A and 15B illustrate a system 1405 for obtaining energy from surface waves in accordance with a further example of the present disclosure. The system 1405 includes multiple arrays of buoys 1400a-c coupled to one another with lateral tethers 1455a-b in a linear or end-to-end arrangement. Buoyant tethers 1440a, 1440b can be coupled to the arrays of buoys 1400a, 1400c, respectively, at opposite ends of the linear or end-to-end arrangement to provide support for the multiple arrays of buoys 1400a-c against a wave, such as a wave propagating in direction 1402a as shown in FIG. 15A. In one aspect, the buoyant tethers 1440a, 1440b can be configured to facilitate orientation or alignment of the multiple arrays of buoys 1400a-c with the wind and incoming wave direction. For example, the buoyant tether 1440b can be located downwind from the buoyant tether 1440a. The downwind buoyant tether 1440b (e.g., a vertical tether portion) can be provided with more length or slack than the buoyant tether 1440b (e.g., the vertical tether portion) located upwind. The additional length or slack of the downwind buoyant tether or vertical tether portion can facilitate movement of the multiple arrays of buoys due to wind and wave movement that can allow the multiple arrays of buoys to realign or reorient with changing wind and wave directions. As shown in FIG. 15B, the wind/waves can change to direction 1402b, thus causing the arrays of buoys to move in direction 1406 away from the original orientation axis 1407 until the slack in the buoyant tether 1440b, which may come from the vertical tether portion 1452b, is removed. The arrays of buoys and buoyant tethers can then assume a generally arcuate shape between the anchor points on the ocean floor according to the drag forces on the various components of the system from the wind/waves.

Figure 16:
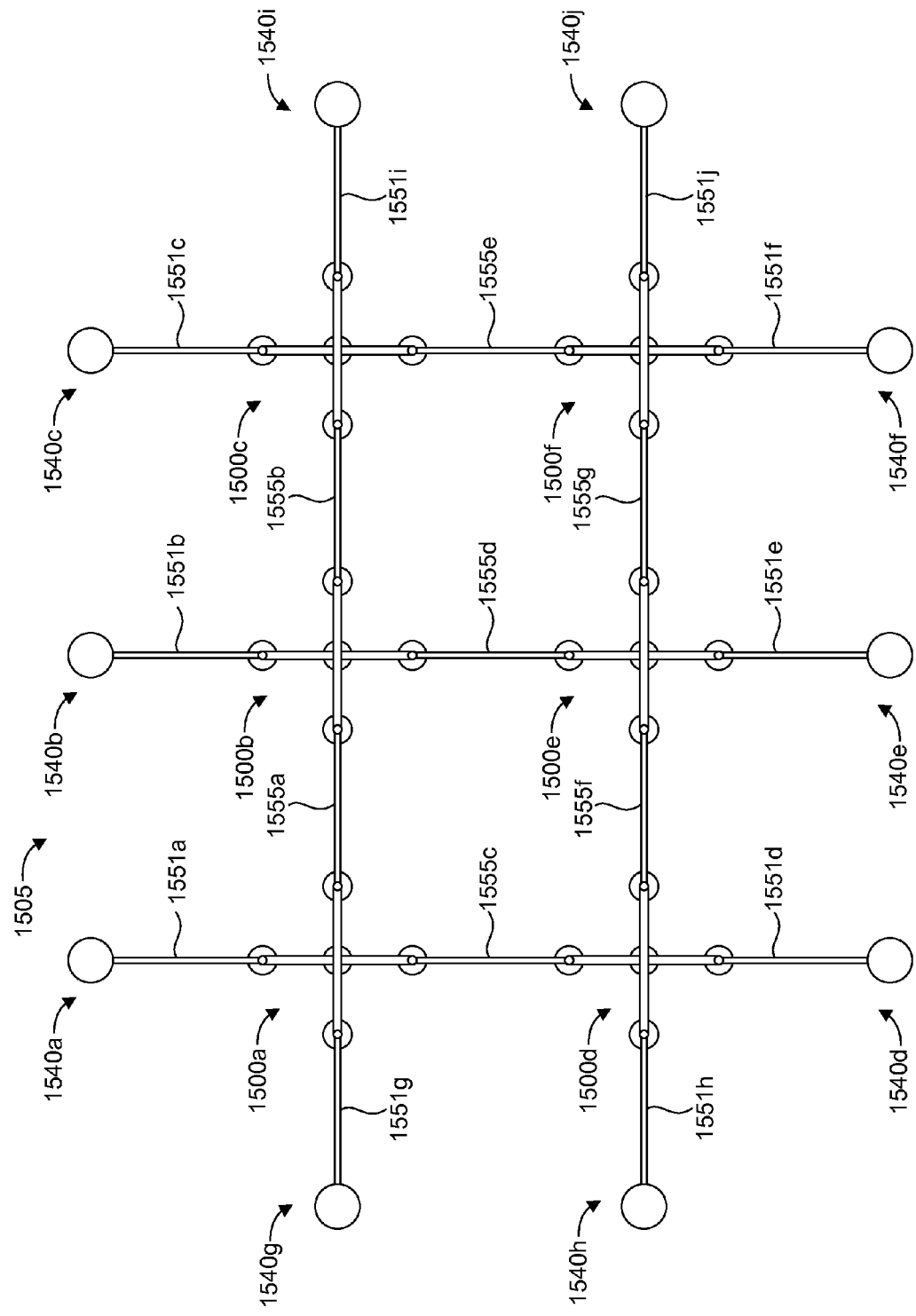
FIG. 16 illustrates a system for obtaining energy from surface waves, in accordance with another embodiment of the present disclosure.

FIG. 16 illustrates a system 1505 for obtaining energy from surface waves in accordance with another example of the present disclosure. The system 1505 includes multiple arrays of buoys 1500a-f coupled to one another with lateral tethers 1455a-g in a grid arrangement or configuration. Buoyant tethers 1440a-j can be coupled to the arrays of buoys about a perimeter of the grid arrangement. In particular, the buoyant tethers 1540a-c are disposed opposite the buoyant tethers 1540d-f, respectively, and the buoyant tethers 1540g-h are disposed opposite the buoyant tethers 1540i-j, respectively. In this configuration, lateral tether portions 1551a-f can be oriented substantially orthogonal to lateral tether portions 1551g-j, which can provide support for the arrays of buoys in multiple directions.

Figure 17:
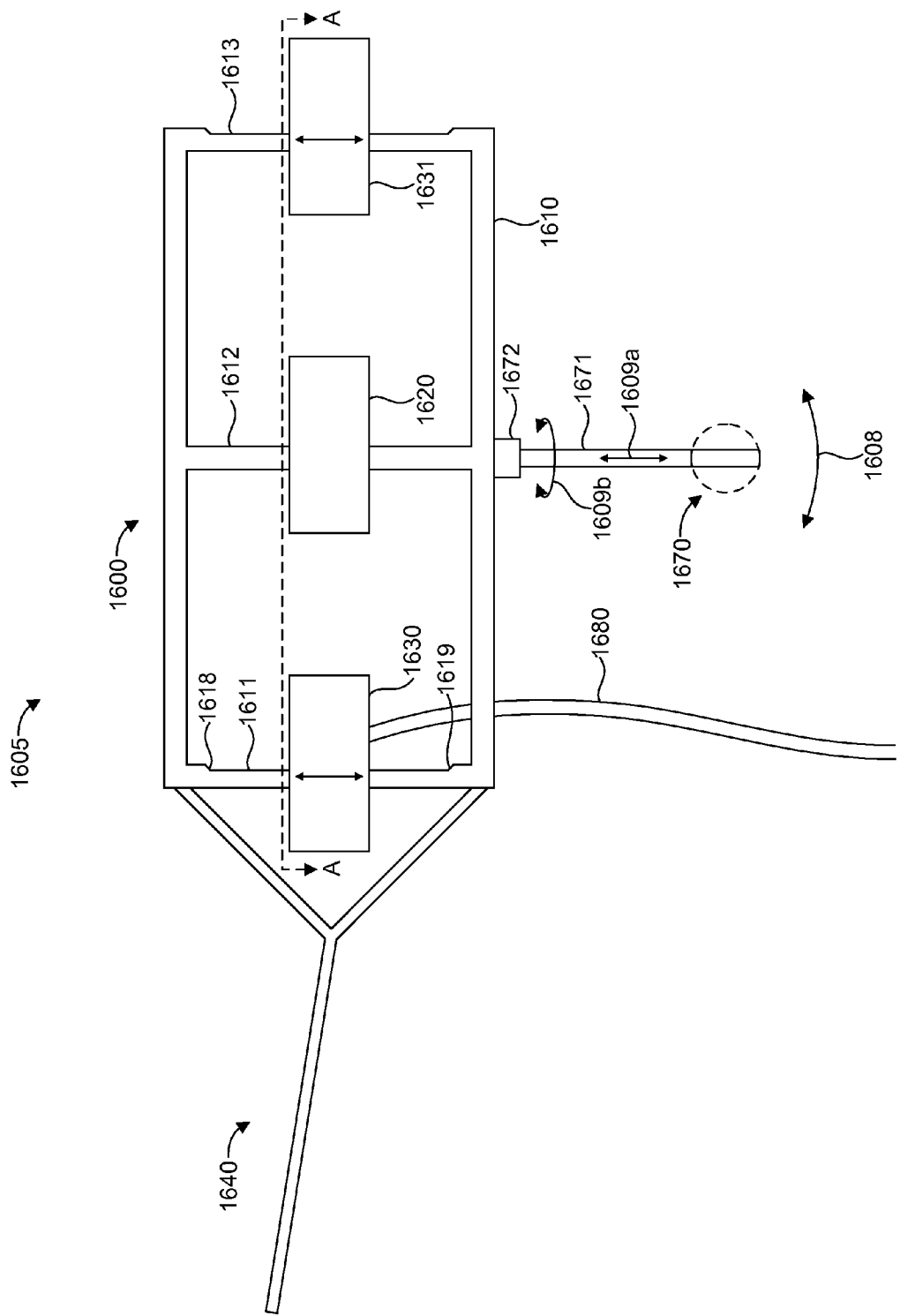
FIG. 17 illustrates a system for obtaining energy from surface waves, in accordance with yet another embodiment of the present disclosure.

FIG. 17 illustrates a system 1605 for obtaining energy from surface waves in accordance with yet another example of the present disclosure. As with other examples described herein, the system 1605 can include an array of buoys 1600 and a buoyant tether 1640 coupled to the array of buoys. In this case, the buoyant tether is shown illustrated as if coupled to an object, such as a boat or other such object that is movable through water to tow the array of buoys. It should be recognized that any suitable buoyant tether may be utilized as described herein. In some embodiments, the tether may not be buoyant, but may be a standard tow line.

Figure 18:
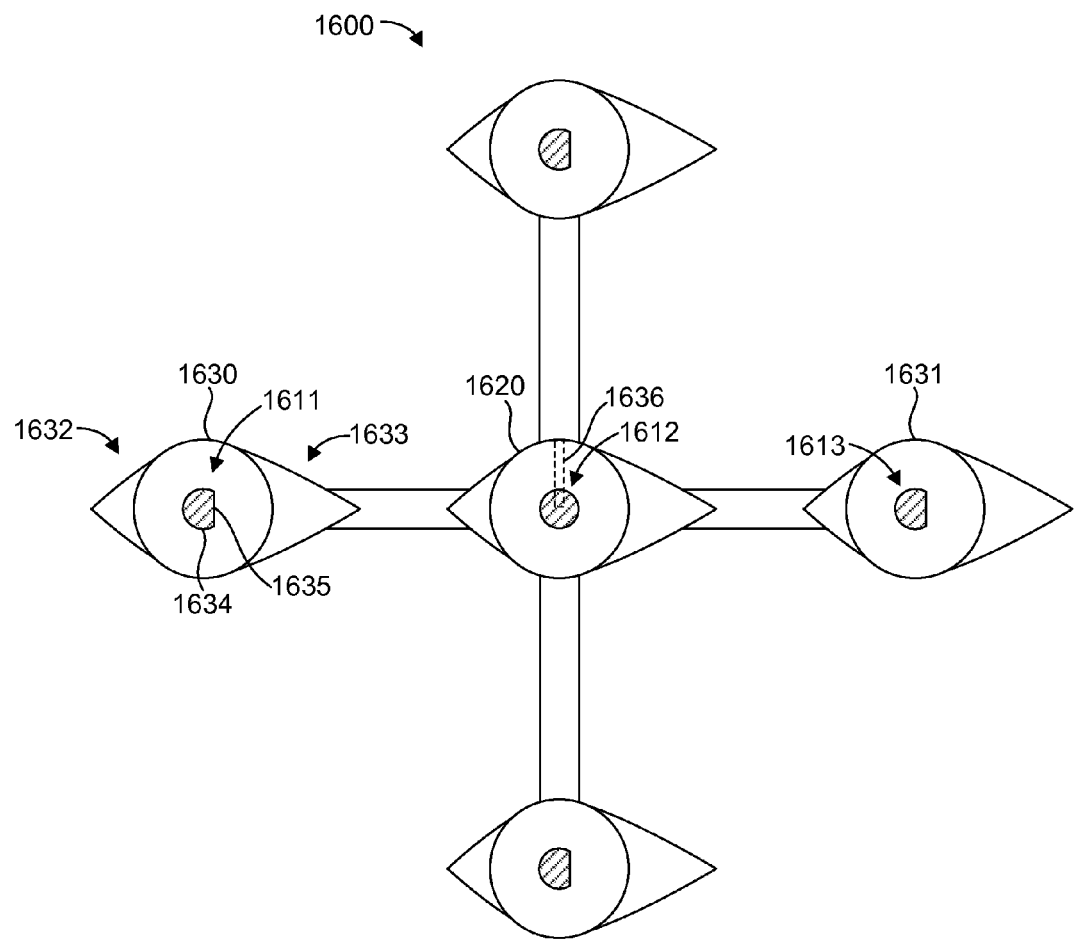
FIG. 18 illustrates a top cross-sectional view of the system of FIG. 17.

In one aspect, one or more of a base buoy 1620 and movable buoys 1630, 1631 of the array of buoys 1600 can comprise a hydrodynamic surface to reduce drag as water passes around the buoy, as shown in a top cross-sectional view A-A in FIG. 18. A hydrodynamic surface can comprise bow portion 1632 at a leading end of the buoy and a stern portion 1633 at a trailing end of the buoy. A length of the bow portion and the stern portion can be different (i.e., short bow portion and long stern portion) to facilitate orienting the array of buoys. In one aspect, all buoys of the array of buoys can include such hydrodynamic surface features and can be oriented in the same direction, as shown in FIG. 18, which can reduce or minimize the forces from the surf or breaking waves on the array of buoys.

With further reference to FIG. 17, the array of buoys 1600 can also include a ballast portion 1670 operable with the base buoy 1620 to move in a "pendulum motion" in direction 1608 in response to a wave in the body of water. The ballast portion can provide stability (e.g., rotational stability) for the array of buoys such that the array of buoys tends to restore itself to an equilibrium position after a small angular displacement. As illustrated in the figure, the ballast portion 1670 can be disposed below the base buoy 1620, such that the base buoy is substantially maintained above the ballast portion. Examples of ballast portions can be found in U.S. Provisional Patent Application No. 62/065,928, filed Oct. 20, 2014, which is incorporated herein by reference. Including the ballast portion 1670 with the array of buoys can enable the array of buoys to remain in, or return to, a desired operational orientation even when subjected to forces (e.g., waves) tending to tip or rotationally displace the array of buoys. The ballast portion 1670 can therefore be utilized in any array of buoys to maintain wave energy harvesting functionality throughout a variety of adverse conditions. Such a design element can be utilized to control "wiggle" of the array of buoys by providing enough negative stability so that the array of buoys will move for effective operation in harvesting wave energy, but with enough positive stability so that the array of buoys will right itself and maintain a desired functional orientation.

An extension member 1671 can be coupled to the base buoy 1620 (e.g., via the framework 1610) and the ballast portion 1670 to suspend the ballast portion below the base buoy. In one aspect, the extension member can be extendable and retractable in direction 1609*a* to vary a distance between the ballast portion and the base buoy, thus varying or controlling the stability of the array of buoys. For example, moving the ballast portion upward can reduce stability and provide for a faster response and moving the ballast portion downward can increase stability and provide for a slower response.

In one aspect, the ballast portion 1670 can be configured as a rudder to facilitate turning or guiding the array of buoys 1600 in the water, such as into the direction of the waves. For example, the ballast portion can be rotatable in direction 1609*b*, such as by a motor 1672, to act as a rudder and guide or steer the array of buoys. The ability to steer the array of buoys can be useful when the array of buoys is being towed by a ship, as the array of buoys can turn with the ship for more for more effective towing and avoidance of obstacles.

In one aspect, vertical members 1611, 1613 of the framework 1610 and the movable buoys 1630, 1631 can be configured to maintain an orientation of the movable buoys relative to the vertical members. For example, as shown in FIG. 18, the vertical members and the movable buoys can have an interfacing geometry 1634 that resists rotation of the movable buoys about the vertical members, such as due to a wave. As illustrated, such a geometrical relationship is provided by a generally circular cross-section with a flat portion 1635 on one side. The flat portion can be ground or machined into a structure having a circular cross-section. In this case, the flat portions are located on back sides of the vertical members or, in other words, on sides opposite the direction of travel as identified by the location of the bow (front) and stern (rear) portions 1632, 1633 of the buoys. Such a configuration can provide low friction for vertical movement of the buoys while resisting rotation of the buoys due to lateral forces that may occur due to waves. It should be recognized that any suitable interfacing geometrical configuration can be utilized, such as a rectangular cross-section. The base buoy 1620 can be fixed relative to the vertical member 1612 by a fastener 1636 or other suitable device. The interfacing geometry can transition to a different shape at transition features 1618, 1619. Such transition features can serve as stops to vertical movement of the movable buoys along the vertical members. In one aspect, the transition features can be configured to bind or wedge the movable buoys when enough force is applied. This can prevent additional movement or operation of the movable buoys in the event of a severe storm or wave event until service or maintenance can be provided, which can minimize the risk of damage to the array of buoys in extreme conditions.

Preventing rotation of the movable buoys 1630, 1631 about the vertical members 1611, 1613 can be particularly beneficial when the movable buoys are configured with hydrodynamic surfaces, such as the bow and stern portions 1632, 1633. The absence of such relative rotation can also be beneficial, even when the movable buoys lack such hydrodynamic surfaces, to prevent tangling of a utility or feed line 1680, which may be coupled to the array of buoys 1600, due to spinning or rotating movable buoys. For example, utility or feed lines can be used to deliver power from a power generator associated with the movable buoys to a transmission line, which may be located underwater. Examples of such utility or feed lines can be found in U.S. patent application Ser. No. 14/600,456, filed Jan. 20, 2015, which is incorporated herein by reference.

In a related embodiment, a method for obtaining energy from a wave in a body of water in accordance with the principles herein is disclosed. The method can include obtaining an array of buoys including a framework having a plurality of vertical members, a base buoy coupled to the framework to support the framework in a body of water and maintain the vertical members in a vertical orientation, a plurality of movable buoys, wherein each of the plurality of movable buoys is movably disposed about a different one of the plurality of vertical members and configured to move relative to the respective vertical members and the base buoy in response to a wave in the body of water, and an energy conversion device operable with each of the plurality of movable buoys to generate power from movement of the movable buoys relative to the vertical members. The method can also include coupling a buoyant tether to the array of buoys. The method can further include disposing the array of buoys in the body of water. Additionally, the method can include securing the array of buoys to an object.

In one aspect of the method, the buoyant tether can comprise a lateral tether portion to couple to the array of buoys, a vertical tether portion to attach to an ocean floor, and a lateral support buoy coupled between the lateral tether portion and the vertical tether portion. It is noted that no specific order is required in this method, though generally in one embodiment, these method steps can be carried out sequentially.

Of course, it is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been described above with particularity and detail in connection with what is presently deemed to be the most practical embodiments of the disclosure, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system for obtaining energy from surface waves, comprising:
   a first array of buoys and a second array of buoys coupled to one another, each of the first and second arrays of buoys including
      a framework having a plurality of vertical members,
      a base buoy coupled to the framework to support the framework in a body of water and maintain the vertical members in a vertical orientation,
      a plurality of movable buoys, wherein each of the plurality of movable buoys is movably disposed about a different one of the plurality of vertical members and configured to move relative to the respective vertical members and the base buoy in response to a wave in the body of water, and
      an energy conversion device operable with each of the plurality of movable buoys to generate power from movement of the movable buoys relative to the vertical members; and
   a first buoyant tether coupled to the first array of buoys to secure the first and second arrays of buoys to an object.

2. The system of claim 1, wherein the first buoyant tether is a utility line carrying at least one of electricity, pumped fluid, or gas.

3. The system of claim 1, wherein the first buoyant tether comprises an attached buoyancy device coupled thereto.

4. The system of claim 1, wherein the first buoyant tether has built in buoyancy.

5. The system of claim 1, wherein the first buoyant tether comprises a primary buoyant tether and a plurality of secondary tethers coupled to the primary tether via a tensioner that facilitates load sharing among the secondary tethers.

6. The system of claim 1, wherein the first buoyant tether is coupled to the first array of buoys via at least one of the framework and the base buoy.

7. The system of claim 1, wherein the first buoyant tether comprises:
   a first lateral tether portion coupled to the first array of buoys;
   a first vertical tether portion to attach to an ocean floor; and
   a first lateral support buoy coupled between the first lateral tether portion and the first vertical tether portion.

8. The system of claim 7, wherein the first lateral support buoy substantially provides buoyancy for at least one of the first lateral tether and the first vertical tether.

9. The system of claim 7, wherein at least one of the first lateral tether and the first vertical tether comprises an attached buoyancy device coupled thereto.

10. The system of claim 7, wherein at least one of the first lateral tether and the first vertical tether has built in buoyancy.

11. The system of claim 7, further comprising a second buoyant tether coupled to the second array of buoys to secure the first and second arrays of buoys to the object.

12. The system of claim 11, wherein the second buoyant tether comprises:
    a second lateral tether portion coupled to the first or second array of buoys;
    a second vertical tether portion to attach to the ocean floor; and
    a second lateral support buoy coupled between the second lateral tether portion and the second vertical tether portion.

13. The system of claim 12, wherein the first buoyant tether and the second buoyant tether are coupled about opposite ends of the first and second arrays of buoys.

14. The system of claim 13, wherein the first and second vertical tether portions are configured to facilitate changing an orientation of the first and second arrays of buoys when attached to the ocean floor.

15. The system of claim 12, wherein the first lateral tether portion and the second lateral tether portion are coupled to the respective first and second arrays of buoys such that the first and second lateral tether portions are substantially orthogonal to one another.

16. The system of claim 1, wherein at least one of the base buoy and the plurality of movable buoys comprises a hydrodynamic surface to reduce drag as water passes around the buoy.

17. The system of claim 1, wherein the vertical members and the plurality of movable buoys are configured to maintain an orientation of the plurality of movable buoys relative to the vertical members.

18. The system of claim 1, wherein each of the first and second arrays of buoys further comprises a ballast portion operable with the base buoy to move in a pendulum motion in response to a wave in the body of water, wherein the base buoy is substantially maintained above the ballast portion.

19. The system of claim 18, wherein each of the first and second arrays of buoys further comprises an extension member coupled to the base buoy and the ballast portion to suspend the ballast portion below the base buoy.

20. The system of claim 19, wherein the extension member is extendable and retractable to vary a distance between the ballast portion and the base buoy to vary stability of the array of buoys.

21. The system of claim 18, wherein the ballast portion is configured as a rudder to facilitate steering the array of buoys through the water.

22. A method for obtaining energy from a wave in a body of water, comprising:
    obtaining a first array of buoys and a second array of buoys coupled to one another, each of the first and second arrays of buoys including:
       a framework having a plurality of vertical members,
       a base buoy coupled to the framework to support the framework in a body of water and maintain the vertical members in a vertical orientation,
       a plurality of movable buoys, wherein each of the plurality of movable buoys is movably disposed about a different one of the plurality of vertical members and configured to move relative to the respective vertical members and the base buoy in response to a wave in the body of water, and an energy conversion device operable with each of the plurality of movable buoys to generate power from movement of the movable buoys relative to the vertical members;

coupling a first buoyant tether to the first array of buoys;

disposing the first and second arrays of buoys in the body of water; and securing the first and second arrays of buoys to an object.

23. The method of claim 22, wherein the first buoyant tether comprises:
- a first lateral tether portion to couple to the first array of buoys;
- a first vertical tether portion to attach to an ocean floor; and
- a first lateral support buoy coupled between the first lateral tether portion and the first vertical tether portion.

24. The system of claim 1, wherein the first buoyant tether includes submerged buoys adapted to provide tension between the first array of buoys and the object.

25. The system of claim 1, wherein the first buoyant tether comprises a tensioner adapted to facilitate a change in length of the buoyant tether between the first array of buoys and the object to compensate for changing ocean height due to waves and tides.

26. The system of claim 12, wherein the first and second lateral support buoys are operable to move toward and away from the first array of buoys under changing wave conditions to maintain the first and second buoyant tethers under tension to reduce slack in the first and second buoyant tethers.

27. The system of claim 12, wherein the first and second lateral support buoys are operable to provide support for the first array of buoys against waves propagating in different directions.

* * * * *